US012449257B2

(12) United States Patent
Jordan et al.

(10) Patent No.: US 12,449,257 B2
(45) Date of Patent: Oct. 21, 2025

(54) CONTROL OF LASER FREQUENCY IN AN OPTICAL GYROSCOPE WITH A RING RESONATOR

(71) Applicants: DRS Network & Imaging Systems, LLC, Melbourne, FL (US); University of Rochester, Rochester, NY (US)

(72) Inventors: Andrew Jordan, Laguna Beach, CA (US); Jaime Cardenas, Rochester, NY (US); Meiting Song, Rochester, NY (US)

(73) Assignees: DRS Network & Imaging Systems, LLC, Melbourne, FL (US); University of Rochester, Rochester, NY (US)

( * ) Notice: Subject to any disclaimer, the term of this patent is extended or adjusted under 35 U.S.C. 154(b) by 217 days.

(21) Appl. No.: 18/078,675

(22) Filed: Dec. 9, 2022

(65) Prior Publication Data

US 2023/0184554 A1    Jun. 15, 2023

Related U.S. Application Data

(60) Provisional application No. 63/288,423, filed on Dec. 10, 2021.

(51) Int. Cl.
*G01C 19/66* (2006.01)
*G01C 19/72* (2006.01)
*G02B 6/293* (2006.01)

(52) U.S. Cl.
CPC ......... *G01C 19/661* (2013.01); *G01C 19/727* (2013.01); *G02B 6/29338* (2013.01)

(58) Field of Classification Search
CPC ............................ G01C 19/661; G01C 19/727
See application file for complete search history.

(56) References Cited

U.S. PATENT DOCUMENTS

| 8,514,400 B2* | 8/2013 | Mohageg | G01C 19/72 |
| | | | 356/459 |
| 9,537,283 B2* | 1/2017 | Strandjord | H01S 3/1304 |
| 9,703,045 B2* | 7/2017 | Evans | G02B 6/29302 |
| 11,060,868 B2* | 7/2021 | Josemans | G01C 19/721 |

OTHER PUBLICATIONS

Ultrasensitive Beam Deflection Measurement via Interferometric Weak Value Amplification (Year: 2009).*
Arvidsson-Shukur et al., "Quantum advantage in postselected metrology", Nature Communications, vol. 11, 2020, 7 pages.
Black, "An introduction to Pound-Drever-Hall laser frequency stabilization", Am. J. Phys., vol. 29, No. 1,, Jan. 2001, 79-87.
De Labachelerie et al., "The frequency control of laser diodes", J. Phys. III France,, Sep. 1992, 1557-1589.

* cited by examiner

*Primary Examiner* — Tarifur R Chowdhury
*Assistant Examiner* — Kaitlyn E Kidwell
(74) *Attorney, Agent, or Firm* — Kilpatrick Townsend & Stockton LLP

(57) ABSTRACT

Photonic devices and methods for operation thereof are disclosed. A photonic device may include a laser configured to generate light. The photonic device may also include a weak value device having a ring resonator. The weak value device may receive the light from the laser and modify the light using the ring resonator to form return light. The photonic device may further include a stabilizing structure configured to generate a tuning signal based on the return light and control one or both of the laser or the ring resonator using the tuning signal to lock a frequency of the laser to a resonance frequency of the ring resonator.

18 Claims, 18 Drawing Sheets

CONTROL OF LASER FREQUENCY IN AN OPTICAL GYROSCOPE WITH A RING RESONATOR

CROSS-REFERENCES TO RELATED APPLICATIONS

This application claims the benefit of priority to U.S. Provisional Patent Application No. 63/288,423, filed Dec. 10, 2021, entitled "CONTROL OF LASER FREQUENCY IN AN OPTICAL GYROSCOPE WITH A RING RESONATOR," the entire content of which is incorporated herein by reference for all purposes.

STATEMENT AS TO RIGHTS TO INVENTIONS MADE UNDER FEDERALLY SPONSORED RESEARCH AND DEVELOPMENT

NOT APPLICABLE

BACKGROUND OF THE INVENTION

Recent efforts have considered different ways to miniaturize inertial measurement units (IMUs), which would be a huge boon for many areas of navigation. Such miniaturized IMUs could be incorporated into an electronic chip and would consume less power. Accurate and small scale IMUs could become a widespread and common technology. For example, IMUs could be used as a complement to Global Positioning System (GPS) navigation, particularly in situations when GPS signals cannot be accessed for a variety of reasons.

One approach for pursuing such IMUs includes utilizing elastic waves in a three-dimensional (3D) structure that freely process in absolute space, independent of device rotation. Other approaches include Nuclear Magnetic Resonance (NMR) and Atomic Interferometry (AI) inertial sensors. Despite the progress made, new systems, methods, and other techniques related to IMUs are needed.

SUMMARY OF THE INVENTION

Embodiments described herein relate broadly to optical gyroscopes based on the field of integrated optics. More particularly, embodiments relate to the stabilization of the laser used in optical gyroscopes to prevent any frequency drifting. The controlled motion of light through microscale waveguides and interferometers can serve as a stable platform for sensitive gyroscope and inertial measurement unit (IMU) measurements. Embodiments described herein are suitable for a variety applications, particularly when the described gyroscope is combined with a comparable precision accelerometer, which would enable miniaturized inertial navigation.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of locking a laser to a ring resonator of a weak value device, the method comprising: generating light at the laser; sending the light to the weak value device; modifying the light at the weak value device using the ring resonator to form return light; generating a tuning signal at a stabilizing structure based on the return light; and controlling one or both of the laser or the ring resonator using the tuning signal to lock a frequency of the laser to a resonance frequency of the ring resonator.

Example 2 is the method of example(s) 1, further comprising: sending the return light from a bright port of the weak value device to the stabilizing structure, wherein the light that is sent to the weak value device is input light, and wherein the input light is sent to the bright port of the weak value device.

Example 3 is the method of example(s) 2, wherein modifying the light at the weak value device using the ring resonator further forms output light.

Example 4 is the method of example(s) 3, wherein the output light is outputted at a dark port of the weak value device, and wherein the dark port is separate from the bright port.

Example 5 is the method of example(s) 4, wherein the output light is detected by a detector coupled to the dark port.

Example 6 is the method of example(s) 5, wherein the output light as detected by the detector is used to determine a rotation of a photonic device that includes the laser, the stabilizing structure, the weak value device, and the detector.

Example 7 is the method of example(s) 1-6, further comprising: adding sidebands to the light at the stabilizing structure to form input light, wherein the input light is sent to the weak value device.

Example 8 is the method of example(s) 7, wherein the tuning signal is generated based on the sidebands of the return light.

Example 9 is the method of example(s) 1-8, wherein the tuning signal causes the frequency of the laser to increase or decrease towards the resonance frequency of the ring resonator.

Example 10 is the method of example(s) 1-9, wherein the tuning signal causes the resonance frequency of the ring resonator to increase or decrease towards the frequency of the laser.

Example 11 is a photonic device comprising: a laser configured to generate light; a weak value device having a ring resonator, the weak value device configured to: receive the light from the laser; and modify the light using the ring resonator to form return light; and a stabilizing structure configured to: generate a tuning signal based on the return light; and control one or both of the laser or the ring resonator using the tuning signal to lock a frequency of the laser to a resonance frequency of the ring resonator.

Example 12 is the photonic device of example(s) 11, wherein the photonic device is a gyroscope.

Example 13 is the photonic device of example(s) 11-12, wherein the weak value device is further configured to: send the return light from a bright port of the weak value device to the stabilizing structure, wherein the light that is sent to the weak value device is input light, and wherein the input light is received at the bright port of the weak value device.

Example 14 is the photonic device of example(s) 13, wherein modifying the light at the weak value device using the ring resonator further forms output light.

Example 15 is the photonic device of example(s) 14, wherein the weak value device is further configured to: output the output light at a dark port of the weak value device, and wherein the dark port is separate from the bright port.

Example 16 is the photonic device of example(s) 15, further comprising: a detector coupled to the dark port and configured to detect the output light.

Example 17 is the photonic device of example(s) 16, wherein the output light as detected by the detector is used to determine a rotation of the photonic device.

Example 18 is the photonic device of example(s) 11-17, wherein the stabilizing structure is further configured to: add sidebands to the light to form input light, wherein the input light is received by the weak value device.

Example 19 is the photonic device of example(s) 18, wherein the tuning signal is generated based on the sidebands of the return light.

Example 20 is the photonic device of example(s) 11-19, wherein: the tuning signal causes the frequency of the laser to increase or decrease towards the resonance frequency of the ring resonator; or the tuning signal causes the resonance frequency of the ring resonator to increase or decrease towards the frequency of the laser.

Numerous benefits are achieved by way of the present invention. For example, the described laser stabilization technique combined with the weak value based integrated optical gyroscope has at least the following novel advances. First, using the gyroscope ring resonator itself as the stable cavity in the Pound-Drever-Hall (PDH) scheme eliminates the need for an additional cavity external to the system. Additionally, the use of the dark port to make the rotation phase readout at the resonance frequency, while using the bright port to create the error signal on the laser frequency to stabilize the laser, utilizes the fact that the bright port contains little information about the rotation-induced phase, thereby preventing the rotation phase from being interpreted as laser drift. Tapering the bright port waveguide to shed any residual $TE_1$ component further makes the bright port independent of the rotation phase. Additionally, the locking of the laser to the gyroscope cavity has the added benefit that any drifts of the ring resonance frequency will be tracked by the laser, keeping the resonance condition met at all times. Since the stabilizing cavity is also the sensing cavity, miniaturization of the setup is possible by making the laser source a diode laser.

The design of the weak value based optical gyroscope also presents numerous benefits over conventional approaches. For example, the weak value readout method enhances the signal-to-noise (SNR) ratio over existing integrated optical gyroscopes. Some embodiments can achieve one or two orders of magnitude improvement in rotation precision and reduction of sources of error noise. For example, some embodiments can achieve a precision of 0.01°/h, and a bias stability of 0.005°/h. Such performance numbers would enable platform stabilization (for tactical applications), missile navigation (for high-end tactical applications), as well as aeronautics navigation. Other benefits of the present invention will be readily apparent to those skilled in the art.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label, irrespective of the second reference label.

DETAILED DESCRIPTION OF SPECIFIC EMBODIMENTS

Figure 1:
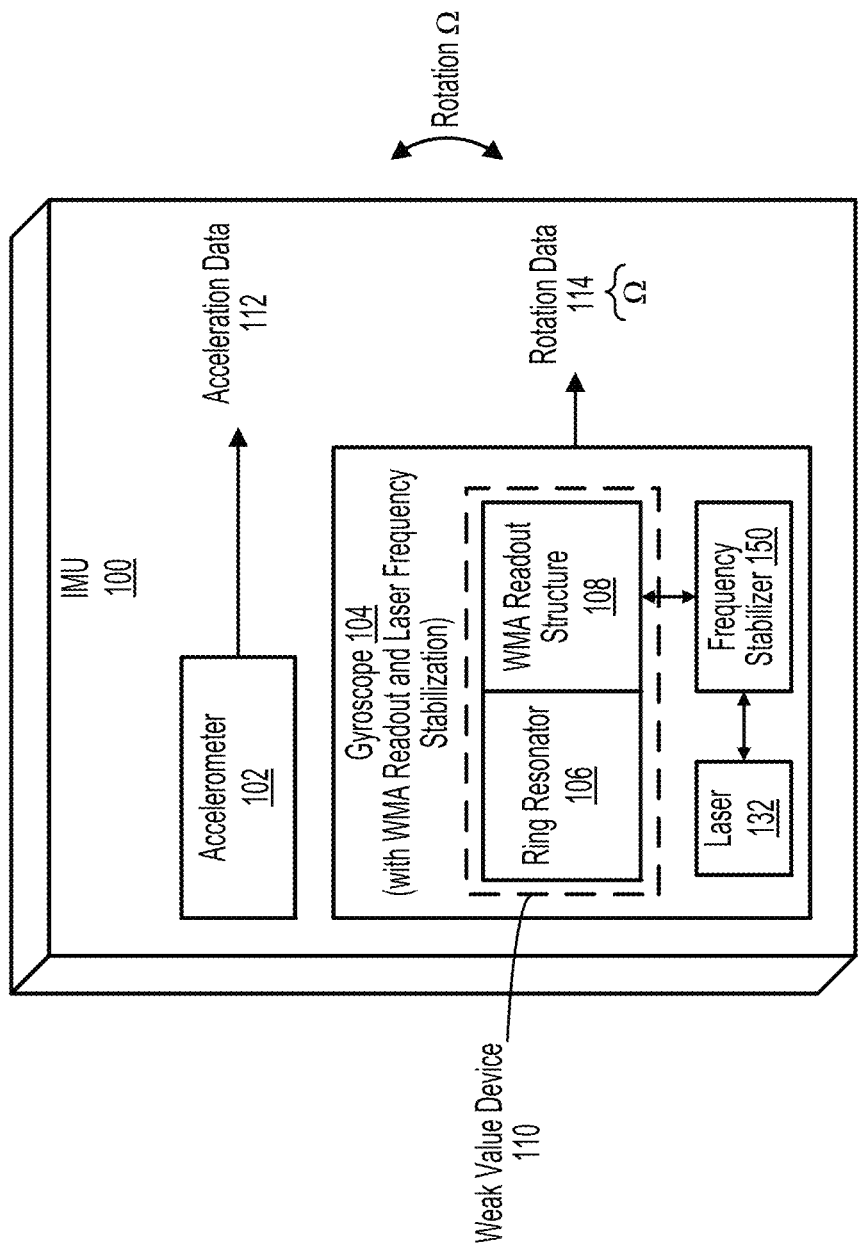
FIG. 1 illustrates an example of an IMU that includes various motion-detecting components, including an accelerometer and a gyroscope according to an embodiment of the present invention.

In some instances, an optical gyroscope can include a weak measurement amplification (WMA) readout structure. These elements can be implemented as a chip-scale integrated optics WMA sensor that is capable of detecting rotations of the sensor. Such a sensor may alternatively referred to throughout the present description as a gyroscope, an optical gyroscope, a gyroscope with WMA readout, an optical device, a photonic device, and a chip-scale device, among others. These terms may be used interchangeably in the present description, and the use of one term over another should not be considered limiting unless indicated otherwise.

In some embodiments, a chip-scale gyroscope is provided that includes a ring resonator that is weakly coupled (e.g., evanescently coupled) to an interferometric readout structure. The rotation sensing ring may be coupled with a single or multiple points of contact to the readout structure. Light is injected into the chip at one end of a lower waveguide and is split at a 50/50 beam splitter (e.g., implemented with waveguide coupling) into lower and upper waveguides. The light then transverses and couples to the ring resonator from both paths. The light changes its magnitude and phase from the ring coupling, and the phase due to rotation is imparted. That phase is then read out with the inverse weak value interferometer implemented by the readout structure. Light is tapped out with auxiliary waveguides and the primary waveguides. In the reverse direction, the beam splitter interferes both lower and higher modes, so the final mode sorter takes a small portion of information rich light, and divides it into two outputs that are provided at a dark port, which are detected and differenced.

Embodiments described herein relate to an optical gyroscope having a stabilized laser that is less susceptible to the various sources of laser drift, which may include spontaneous emission, temperature variations, mechanical imperfections, and laser gain dynamics, and the like. For optical gyroscopes, the stability of the laser frequency can be important as a frequency drift may be interpreted as a rotation of the device, thereby introducing an error signal to the gyroscope's measurement. Certain stabilization techniques, such as the Pound-Drever-Hall (PDH) technique, may require the existence of an optical cavity external to the laser (reference cavity) that is more stable than the laser itself.

Some embodiments described herein utilize the ring resonator that is included in the optical gyroscope itself to lock the laser. The device can determine when the laser frequency is drifting and, in response, provide a tuning capability, such as changing the cavity length of the laser, so as to stabilize the laser by adaptive control. Rather than using an external cavity, using the cavity of the ring resonator has the added benefits that the laser frequency will follow any slow drifts of the ring resonance, enabling enhanced performance. The application of this stabilization technique to the weak value integrated optical gyroscope device is made possible by using the WMA gyroscope dark port light in the inverse weak value protocol as the detected signal that depends sensitively on the rotation frequency, while the bright port light can be shown to be independent of the rotation of the sample, depending only on the frequency of the laser. This bright light source, detected, then mixed, demodulated, and filtered is used as the feedback control signal to control the tuning port of the laser, completing the feedback loop. By utilizing the ring resonator as both the sensing element and the reference cavity, embodiments of the present invention enable the miniaturization of the laser stabilization step, which would ordinarily require an external cavity, such as a Fabry-Pérot cavity.

The incorporation of weak value techniques, such as weak value amplification (WVA) and inverse weak value amplification (IWVA), into the field of integrated photonics creates a number of useful applications. Many of these applications are due to the reduction of the size of the measuring system to the millimeter scale. Furthermore, since integrated photonic devices are inherently stable, they are less susceptible to environmental factors, such as vibrations. With an on-chip, weak value amplification device, precision measurements can be carried out in a small volume with reliable performance. The weak value technique allows the amplification of small signals by introducing a weak perturbation to the system and performing a post-selection on the data.

In some instances, IWVA can be demonstrated using free space optics and a misaligned Sagnac interferometer. One goal may be to measure the relative phase shift $\phi$ between the two paths of the interferometer. The misalignment introduces a phase front tilt k to one path of the interferometer and −k to the other.

$$\psi_\pm(x) = \phi_0(x) e^{\pm i\left(kx-\frac{\phi}{2}\right)}$$

When the two paths interfere at the beam splitter, considering a Gaussian input, the dark port becomes, $$\psi_D(x) \propto \psi_+(x) - \psi_-(x) = \frac{e^{\frac{x^2}{4\sigma^2}}}{(2\pi\sigma^2)^{\frac{1}{4}}} \sin\left(kx - \frac{\phi}{2}\right)$$

By measuring the mean location shift $-\phi/(2k)$ of the dark port pattern, the phase shift $\phi$ is determined.

To bring free space IWVA to the integrated photonics regime, the above expressions are expanded into Hermite-Gaussian (HG) modes. The beams are composed mainly of the $HG_1$ mode, with a small contribution of the $HG_0$ mode. Contribution of the higher modes is negligible. Therefore, the phase front tilt can be considered as coupling the initial $HG_0$ mode partially into the $HG_1$ mode.

$$\psi_\pm(x) \approx \left(1 \mp i\frac{\phi}{2}\right)HG_0 \pm ik\sigma HG_1$$

$$\psi_D(x) \propto i\frac{\phi}{2}HG_0 + ik\sigma HG_1$$

Eigenmodes of a waveguide are similar to Hermite-Gaussian modes. The theory described above can be applied to waveguide eigenmodes $TE_0$ and $TE_1$, assuming that a $TE_0$ mode is sent into an upper waveguide of the device. Its power is split in half and the fields become, $$E_1 = \frac{1}{\sqrt{2}} TE_0(x)$$

$$E_2 = \frac{1}{\sqrt{2}} TE_0(x)$$

Then a relative phase $\phi$ between the two paths is added, $$E_1 = \frac{e^{i\frac{\phi}{2}}}{\sqrt{2}} TE_0(x)$$

$$E_2 = \frac{e^{-i\frac{\phi}{2}}}{\sqrt{2}} TE_0(x)$$

Similar to the free space case, part of the $TE_0$ mode is coupled to the $TE_1$ mode, with opposite phases in the two paths. $\alpha$ is the percentage of the $TE_0$ mode coupled to the $TE_1$ mode, which is small.

$$E_1 = \frac{e^{i\frac{\phi}{2}}}{\sqrt{2}} [(1-a)TE_0(x) + iaTE_1(x)]$$

$$E_2 = \frac{e^{-i\frac{\phi}{2}}}{\sqrt{2}}[(1-a)TE_0(x) - iaTE_1(x)]$$

After the two paths interfere at the second 50/50 splitter, the dark port becomes, $$E_d = E_1 - E_2 = i\left[(1-a)TE_0(x)\sin\frac{\phi}{2} + aTE_1(x)\cos\frac{\phi}{2}\right]$$

Since $\phi$ is very small, $$E_d \approx i\left[(1-a)\frac{\phi}{2}TE_0(x) + aTE_1(x)\right] = ia\left[\frac{(1-a)}{a}\frac{\phi}{2}TE_0(x) + TE_1(x)\right]$$

Therefore, by analyzing the ratio between the $TE_0$ and $TE_1$ modes, the phase $\phi$ can be determined.

The figures herein follow a numbering convention in which the first digit or digits correspond to the figure number and the remaining digits identify an element or component in the figure. Similar elements or components between different figures may be identified by the use of similar digits. For example, 104 may reference element "04" in FIG. 1, and a similar element may be referenced as 204 in FIG. 2. As will be appreciated, elements shown in the various embodiments herein can be added, exchanged, and eliminated so as to provide a number of additional embodiments of the present disclosure. In addition, the proportion and the relative scale of the elements provided in the figures are intended to illustrate certain embodiments of the present disclosure and should not be taken in a limiting sense.

FIG. 1 illustrates an example of an IMU 100 that includes various motion detecting components, including an accelerometer 102 and a gyroscope 104, according to some embodiments of the present invention. Accelerometer 102 may be configured to generate acceleration data 112, which may include accelerations, linear velocities, and/or linear positions for IMU 100. Gyroscope 104 may be configured to generate rotation data 114, which may include angular accelerations, angular velocities/rates, and/or angular positions. Gyroscope 104 may be configured to detect a rotation $\Omega$ experienced by IMU 100.

Gyroscope 104 may include a weak value device 110 that includes a ring resonator 106 and a WMA readout structure 108, which may alternatively be referred to as an IWVA readout structure. Gyroscope 104 may further include a laser 132 that emits light that is passed into weak value device 110. In some embodiments, gyroscope 104 may include a frequency stabilizer 150 that receives the light emitted by laser 132 before being passed into weak value device 110. When employed, frequency stabilizer 150 may further receive the light that is passed back through the bright port of WMA readout structure 108. Based on this "return" light, frequency stabilizer 150 is able to lock laser 132 to the ring resonance of ring resonator 106.

Figure 2:
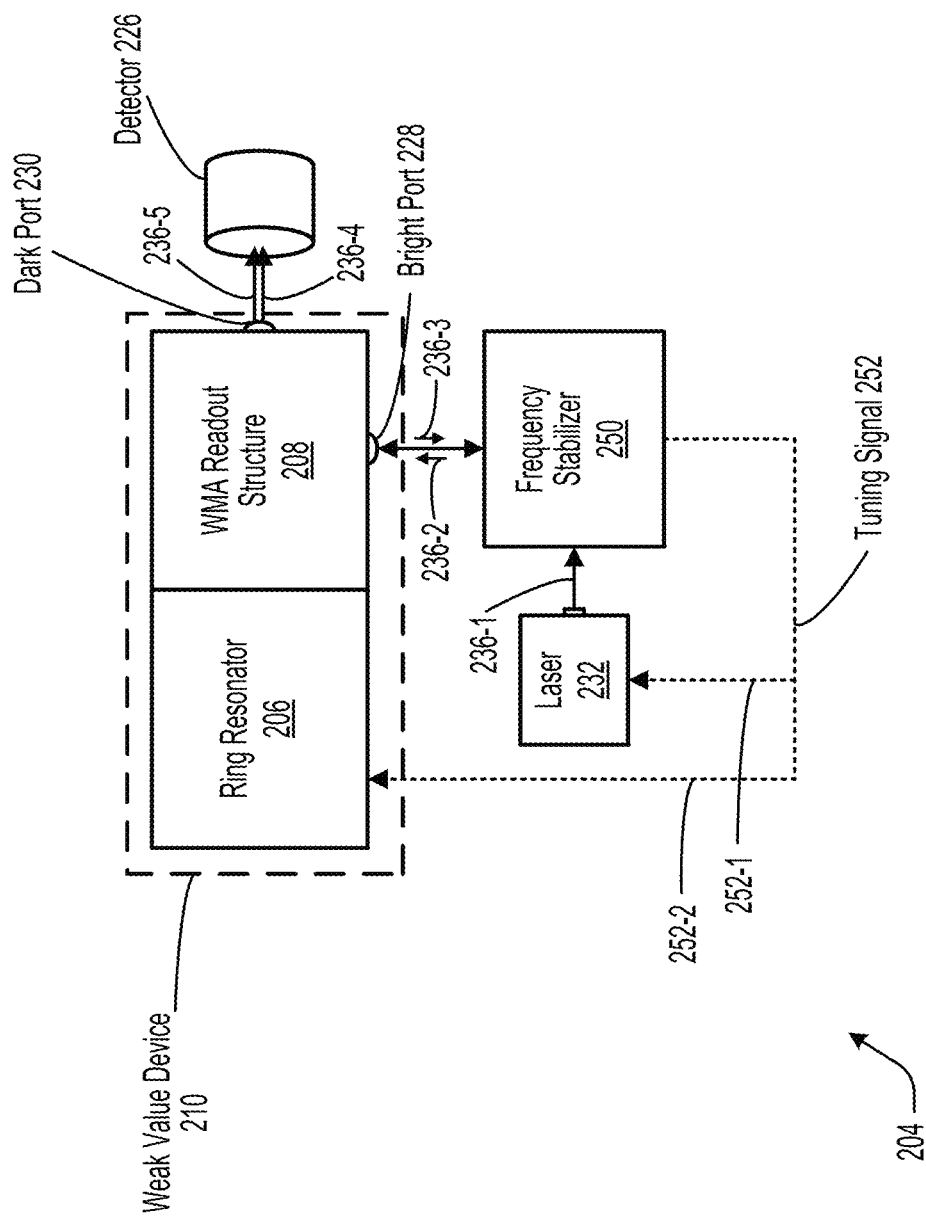
FIG. 2 illustrates an example architecture of a gyroscope according to some embodiments of the present invention.

FIG. 2 illustrates an example architecture of a gyroscope 204, according to some embodiments of the present invention. Gyroscope 204 may include a weak value device 210, a detector 226, a laser 232, and a frequency stabilizer 250. Weak value device 210 may include a ring resonator 206 and a WMA readout structure 208. During operation, light 236-1 generated at laser 232 may be passed to frequency stabilizer 250. Based on light 236-1, frequency stabilizer 250 may pass light 236-2 to weak value device 210 via a bright port 228 of WMA readout structure 208.

Light 236 may then be passed from WMA readout structure 208 to ring resonator 206, and then back to WMA readout structure 208. As described herein, light passed back from ring resonator 206 to WMA readout structure 208 is divided and a portion thereof is sent through bright port 228 as light 236-3 and another portion is sent through dark port 230 as light 236-4 and 236-5 to detector 226. Based on the rotation of ring resonator 206, a phase may be imparted onto light 236-4 and 236-5 (which may contain phase-related information) that is outputted by WMA readout structure 208 at dark port 230, whereas light 236-3 does not include phase information.

Since light 236-3 coming out of WMA readout structure 208 at bright port 228 is not affected by the rotation of ring resonator 206, light 236-3 can be used to perform stabilization of the laser. Light 236-3 has, however, been modulated by passing through ring resonator 206. For example, as described herein, frequency stabilizer 250 may add sidebands to light 236-2, and the sidebands of light 236-3 may be modified by weak value device 210 in a manner that allows frequency stabilizer 250 to determine how to generate a tuning signal 252 so as to lock the frequency of laser 232 to a resonance frequency of ring resonator 206. In the illustrated example, frequency stabilizer 250 may generate a first tuning signal 252-1 to modify laser 232 and/or a second tuning signal 252-2 to modify ring resonator 206.

Figure 3:
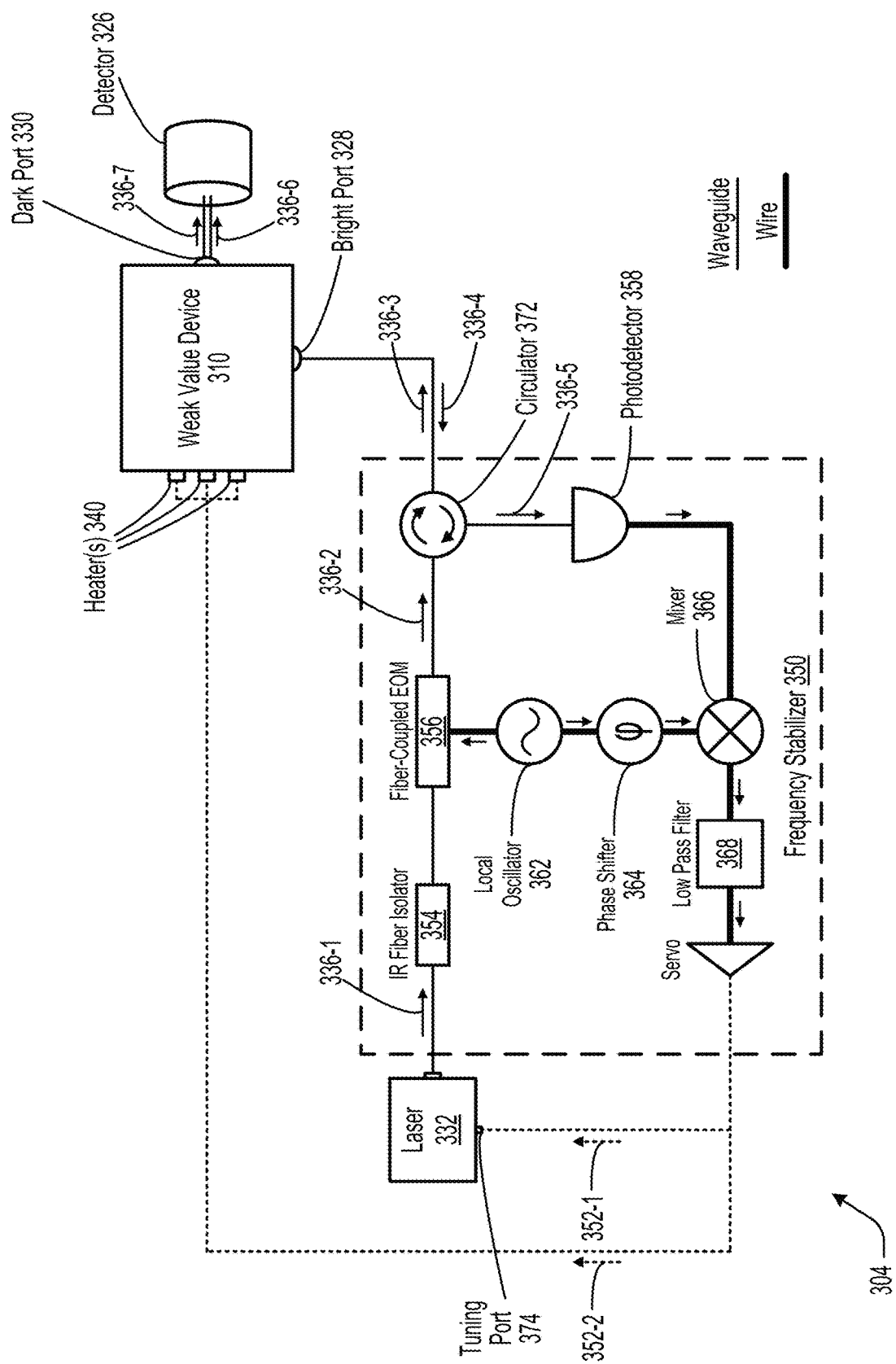
FIG. 3 illustrates an example architecture of a gyroscope according to some embodiments of the present invention.

FIG. 3 illustrates an example architecture of a gyroscope 304, according to some embodiments of the present invention. Gyroscope 304 may include a weak value device 310, a detector 326, a laser 332, and a frequency stabilizer 350. Frequency stabilizer 350 may include an IR fiber isolator 354, a fiber-coupled electro-optic modulator (EOM) 356, a circulator 372, a photodetector 358, a local oscillator 362, a phase shifter 364, a mixer 366, and a low pass filter 368. Waveguides and wires are differentiated in FIG. 3 using thin and thick lines, respectively.

During operation, laser 332 may emit light 336-1 (e.g., laser light or coherent light) at a particular frequency or wavelength (e.g., a wavelength of 1550 nm). Light 336-1 is passed through IR fiber isolator 354 (for preventing back reflections) and subsequently through a fiber-coupled EOM 356 to produce light 336-2. Fiber-coupled EOM 356 may add sidebands onto the incoming light signal based on an electrical signal generated by and received from a local oscillator 362 such that light 336-2 includes sidebands. Light 336-2 passes through circulator 372 unmodified (becoming light 336-3) and is provided as input into weak value device 310 at bright port 328.

Light 336-3 (alternatively referred to as "input light") is received by weak value device 310, is modified by weak value device 310, and is outputted by weak value device 310 at dark port 330 as light 336-6 and 336-7 (alternatively referred to as "output light" or "phase-dependent light") and at bright port 328 as light 336-4 (alternatively referred to as "return light" or "phase-independent light"). Light 336-6 and 336-7 outputted at dark port 330 are provided to detector 326 for detection of the phase imparted by the ring resonator.

Light 336-4 that is outputted by weak value device 310 at bright port 328 is passed into circulator 372 and is sent to photodetector 358 as light 336-5. Photodetector 358 is able to measure the power or intensity of light 336-5 as a function of time and convert the optical signal into an electrical signal that is sent to mixer 366, which mixes the incoming electrical signal with a second electrical signal generated by local oscillator 362 and phase shifted by phase shifter 364

(the second electrical signal representing and having characteristics of light 336-2 and 336-3). The electrical signal outputted by mixer 366 may include a low frequency component and a high frequency component, the latter of which is removed by low pass filter 368. The remaining low frequency component is used to create a tuning signal 352 that either adjusts laser 332 at tuning port 374 to stabilize the laser (by increasing or decreasing the frequency of the laser 332) or adjusts the ring resonator of weak value device 310 at heater(s) 340 (by increasing or decreasing the resonance frequency of the ring resonator).

In various examples, one or both of a first tuning signal 352-1 and a second tuning signal 352-2 may be generated by frequency stabilizer 350 in response to receiving the return light (i.e., light 336-4). In one example, frequency stabilizer 350 may determine, based on the input light (i.e., light 336-3) and the return light (i.e., light 336-4), that the frequency of laser 332 is greater than the resonance frequency of the ring resonator, and in response may generate first tuning signal 352-1 that changes the laser cavity length to decrease the frequency of laser 332. In another example, frequency stabilizer 350 may determine, based on the input light (i.e., light 336-3) and the return light (i.e., light 336-4), that the frequency of laser 332 is greater than the resonance frequency of the ring resonator, and in response may generate second tuning signal 352-2 that adjusts the temperature of heater(s) 340 to increase the resonance frequency of the ring resonator. In another example, frequency stabilizer 350 may determine, based on input light (i.e., light 336-3) and the return light (i.e., light 336-4), that the frequency of laser 332 is greater than the resonance frequency of the ring resonator, and in response may generate both first tuning signal 352-1 that changes the laser cavity length to decrease the frequency of laser 332 and second tuning signal 352-2 that adjusts the temperature of heater(s) 340 to increase the resonance frequency of the ring resonator.

In some embodiments, the sidebands of light 336-2 (and light 336-3) and consequently the sidebands of the return light 336-4 are useful for determining whether the frequency of laser 332 is drifting. As an example, if the power or intensity of the sidebands of light 336-2 are equal and the sidebands of light 336-4 (and light 336-5) are unequal (e.g., left sideband greater than or less than right sideband), then the frequency of laser 332 may be determined to be drifting and may be adjusted accordingly by tuning signal 352. As another example, if the power or intensity of the sidebands of light 336-2 are equal and the sidebands of light 336-4 (and light 336-5) are also equal (e.g., left sideband equal to right sideband), then the frequency of laser 332 may be determined to be locked and tuning signal 352 may not be generated (or, alternatively, a previously generated tuning signal 352 may remain constant and may continue to be applied).

Figure 4A:
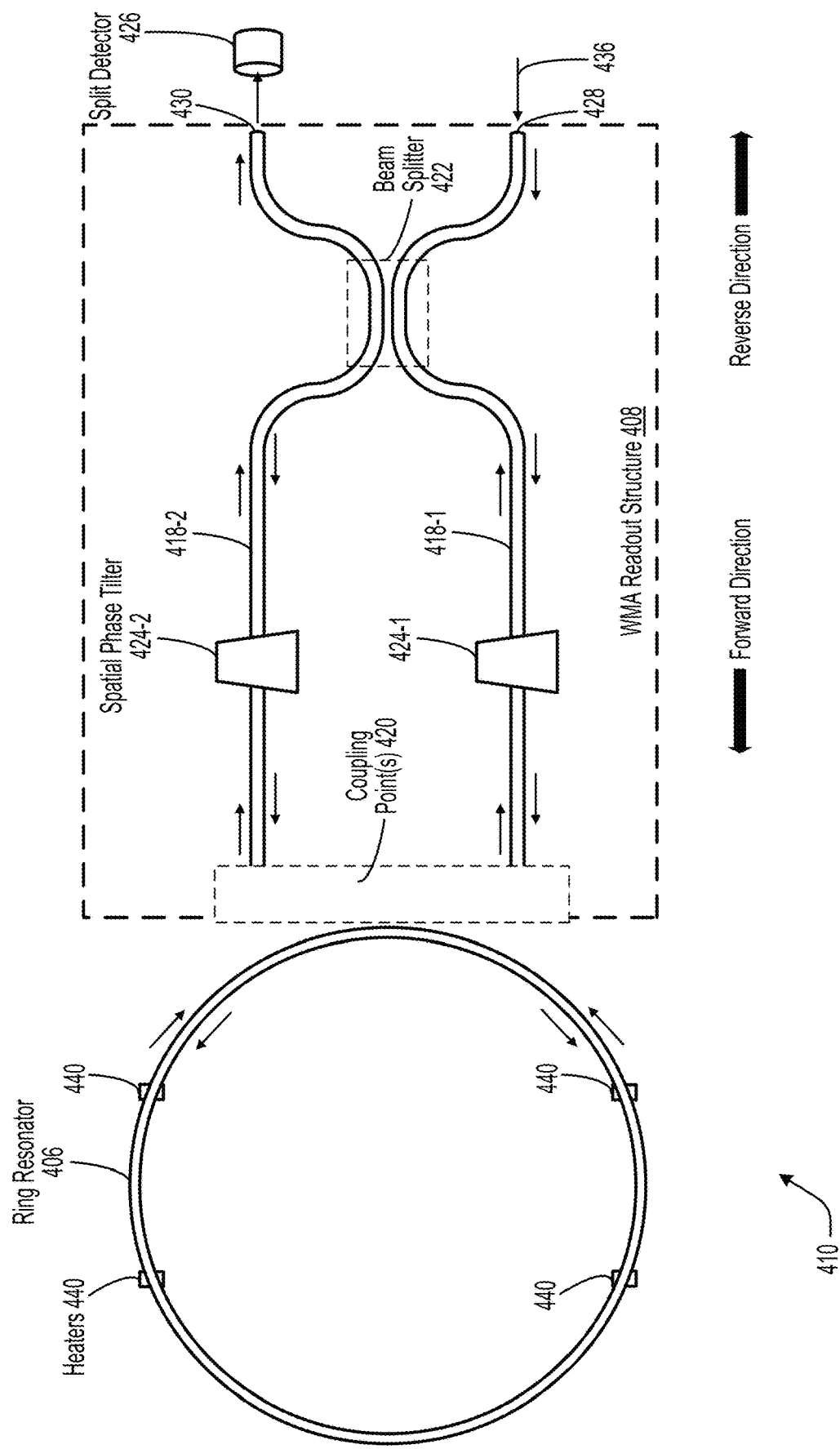
FIGS. 4A and 4B illustrate an example architecture of a weak value device according to some embodiments of the present invention.
Figure 4B:
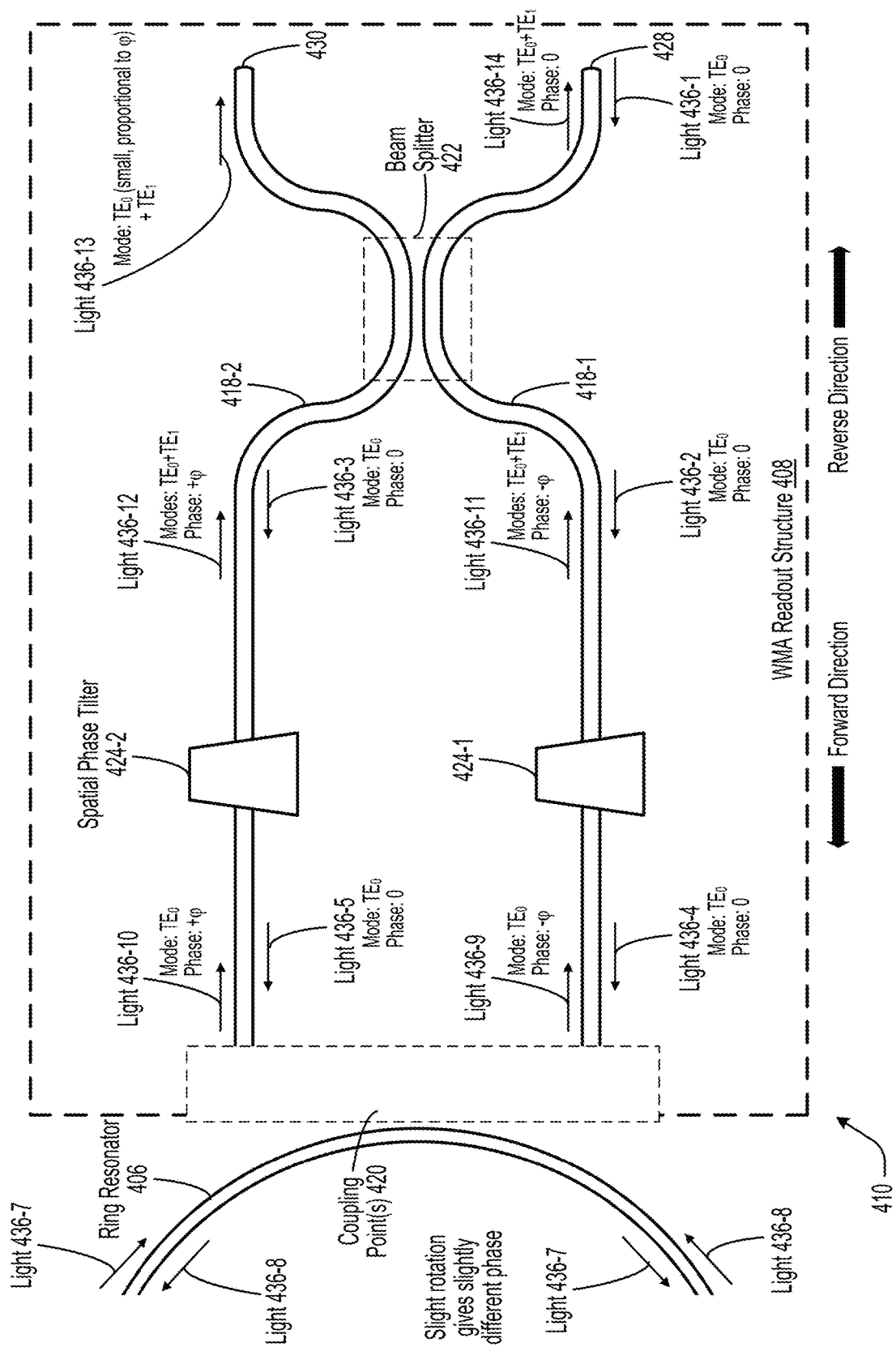

FIGS. 4A and 4B illustrate an example architecture of a weak value device 410, according to some embodiments of the present invention. Weak value device 410 may include a WMA readout structure 408 and a ring resonator 406 coupled with a set of heaters 440. WMA readout structure may include a lower waveguide 418-1 and an upper waveguide 418-2, which may alternatively be referred to as a first waveguide and a second waveguide, respectively. Lower waveguide 418-1 may include a bright port 428 located at one end where light 436 may be inputted into lower waveguide 418-1, and upper waveguide 418-2 may include a dark port 430 located at one end where light may be outputted from upper waveguide 418-2. In some instances, the light that is inputted at bright port 428 may be referred to as input light, and the light that is outputted at dark port 430 may be referred to as output light.

WMA readout structure 408 may include a beam splitter 422 that is formed on and/or between lower waveguide 418-1 and upper waveguide 418-2. For example, a portion of lower waveguide 418-1 may be positioned in close proximity (e.g., within an evanescent threshold distance) to a portion of upper waveguide 418-2 to implement beam splitter 422. For light traveling in lower waveguide 418-1 in the forward direction (e.g., input light), beam splitter 422 may be configured to split the light equally between lower waveguide 418-1 and upper waveguide 418-2. For light traveling in both lower waveguide 418-1 and upper waveguide to 418-2 in the reverse direction, beam splitter 422 may be configured to split the light in each waveguide equally between lower waveguide 418-1 and upper waveguide 418-2. As such, at least a portion of the light traveling in both waveguides in the reverse direction may be combined to form the output light that is output from upper waveguide 418-2 at dark port 430.

In some embodiments, beam splitter 422 is formed by providing evanescent coupling (or evanescent-wave coupling) between lower waveguide 418-1 and upper waveguide 418-2. In such embodiments, lower waveguide 418-1 may be considered to be evanescently coupled to upper waveguide 418-2. As noted above, this can be accomplished by bringing a portion of lower waveguide 418-1 in close proximity (e.g., within a threshold distance) to a portion of upper waveguide 418-2. In some embodiments, beam splitter 422 may be a multi-mode beam splitter that supports evanescent coupling of both $TE_0$ and $TE_1$ modes (or $TM_0$ and $TM_1$ modes). In one implementation, beam splitter 422 is formed by a gap of 0.5 μm and a length of 250 μm.

WMA readout structure 408 may include one or more spatial phase tilters 424 (also referred to as phase front tilters) that are formed on one or both of lower waveguide 418-1 and upper waveguide 418-2. In the illustrated example, a lower spatial phase tilter 424-1 is formed on lower waveguide 418-1 and an upper spatial phase tilter 424-2 is formed on upper waveguide to 418-2. In some embodiments, each of spatial phase tilters 424 is configured to spatially phase tilt the light passing therethrough, such that the modes $TE_0$ and $TE_1$ (or $TM_0$ and $TM_1$) acquire opposite tilted phase fronts. In some embodiments, an extra spatial phase tilt is created of the form $e^{\pm iKtx}$ which is equivalent to introducing the next mode. For example, spatial phase tilters 424 may be configured to excite a $TE_1$ mode (or $TM_1$ mode) in a light signal carrying only a $TE_0$ mode ($TM_0$ mode).

In some embodiments, one or both of spatial phase tilters 424 may include a mode exciter, such as a prism fabricated within one or both of waveguides 418, that is configured to excite a superposition of odd order modes in the light passing therethrough. The mode exciter may include a gradient in the index of refraction across the transverse profile of the waveguide causing some of the electric field amplitude to be transferred to the first excited mode. In some embodiments, one or both of spatial phase tilters 424 may be implemented by widening waveguides 418 at a particular widening point along waveguides 418, such that only a single mode is supported prior to the widening point and a second mode is supported after the widening point.

Figure 5A:
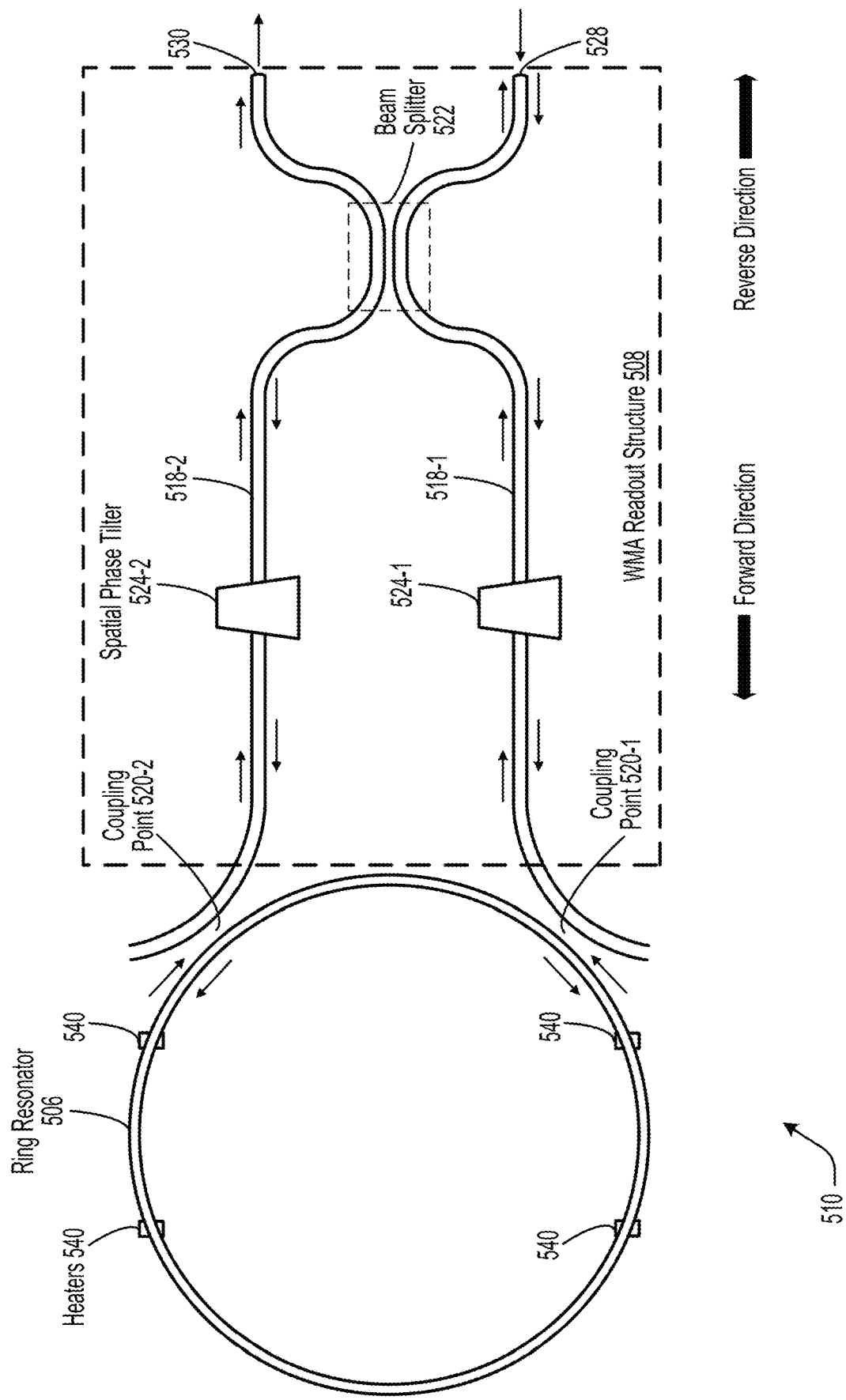
FIGS. 5A, 5B, and 5C illustrate example architectures of a weak value device according to some embodiments of the present invention.
Figure 5B:
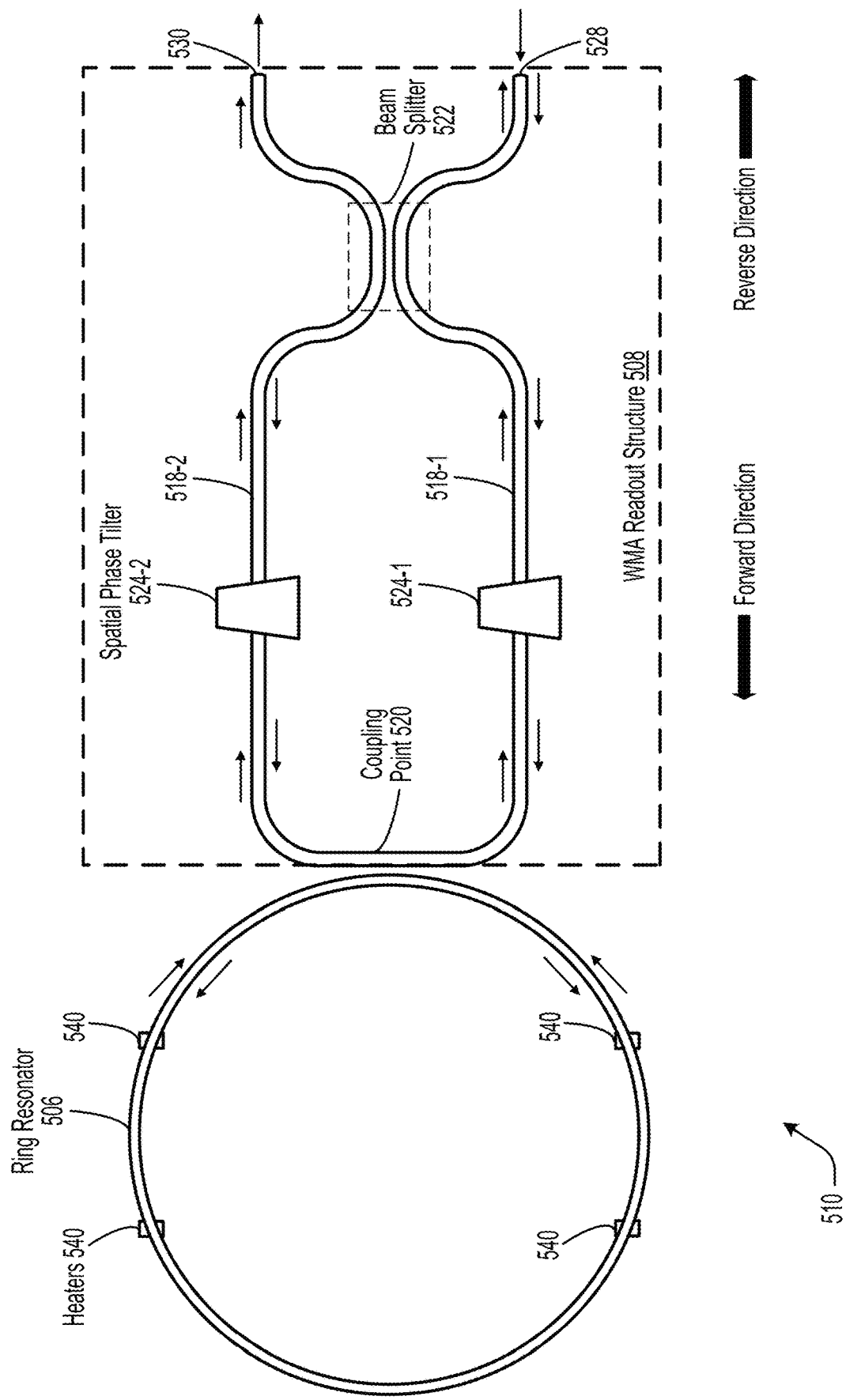
Figure 5C:
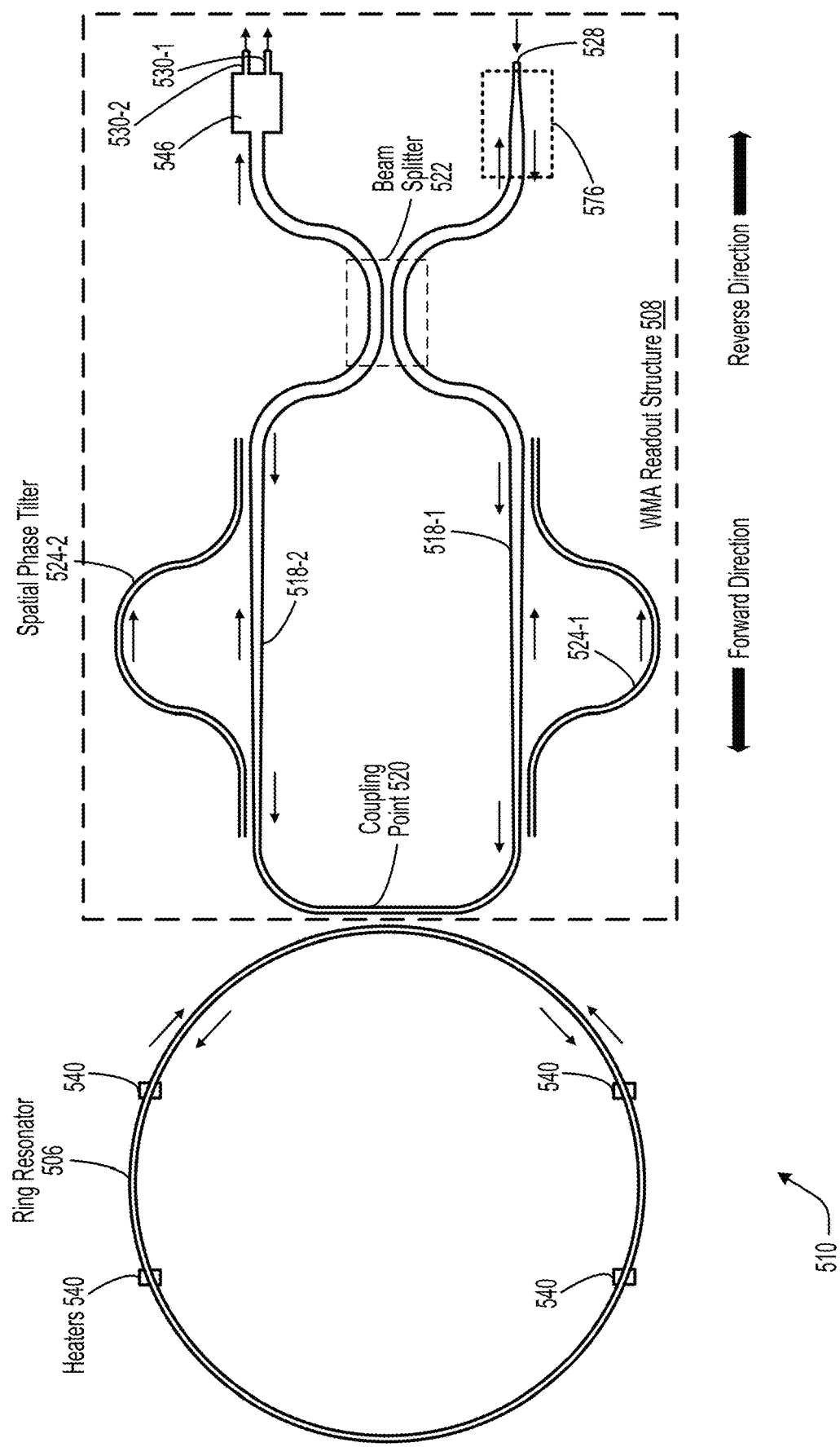
Figure 9:
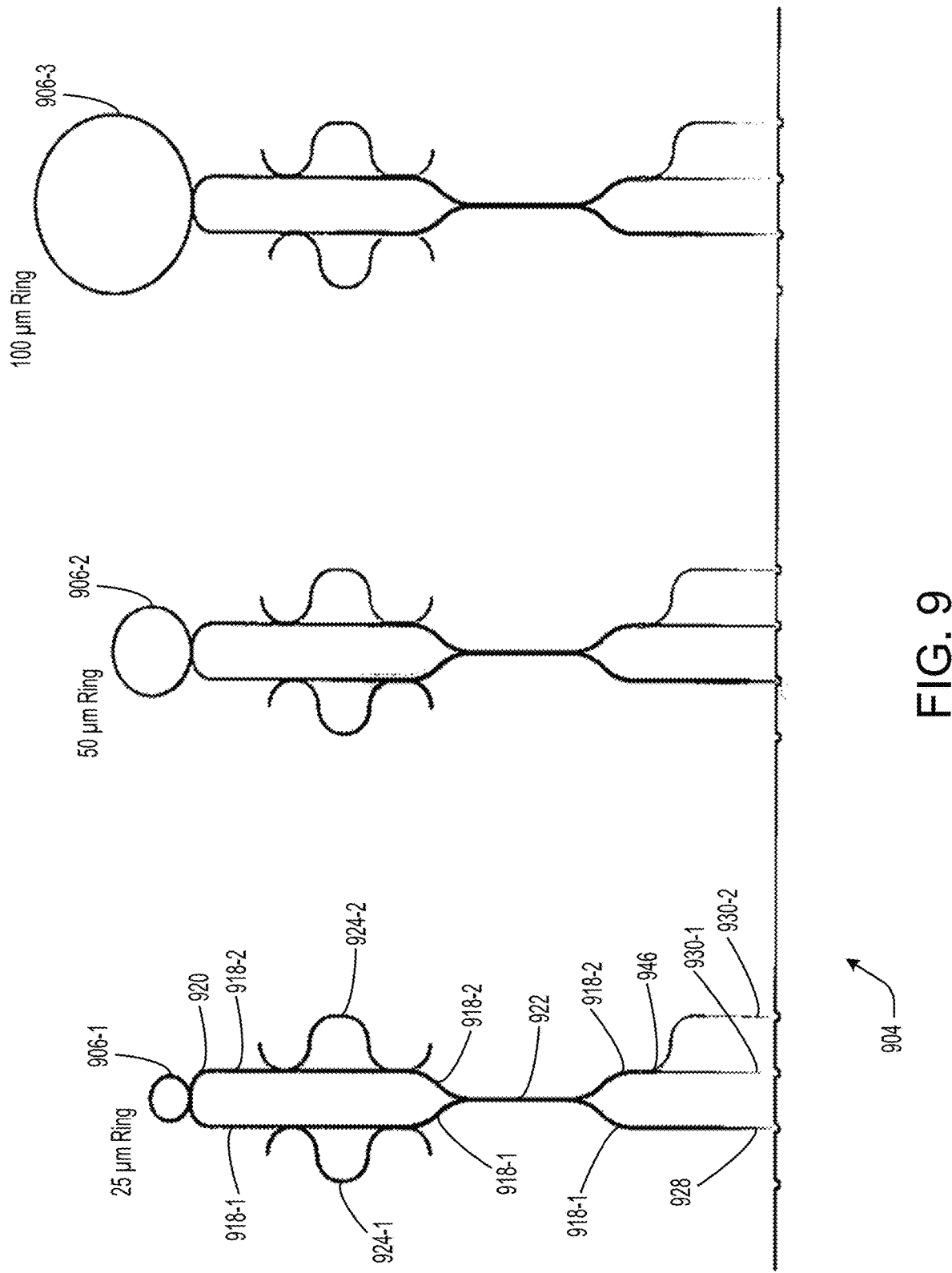
FIG. 9 illustrates a microscope image of an example of a gyroscope having been fabricated with ring resonators and waveguides on the same layer according to some embodiments of the present invention.

In some embodiments, each of spatial phase tilters 424 is formed by bringing two portions (first and second portions) of an additional waveguide in close proximity (e.g., within a threshold distance) to a portion of lower waveguide 418-1 or upper waveguide 418-2 (as shown in FIGS. 5C and 9). In one implementation, the first portion of the additional waveguide (the portion closest to beam splitter 422) may form a gap of 0.3 µm with the first or second waveguides and have a length of 40 µm and the second portion of the additional waveguide (the portion closest to ring resonator 406) may form a gap of 0.5 µm with the first or second waveguides and have a length of 6 µm.

WMA readout structure 408 may include one or more coupling point(s) 420 for coupling the light in lower waveguide 418-1 and upper waveguide 418-2 traveling in the forward direction into ring resonator 406. Additionally, the light circling ring resonator 406 may be coupled into lower waveguide 418-1 and upper waveguide 418-2, in the reverse direction. As such, the light traveling in waveguides 418 in the forward direction that is coupled into ring resonator 406 may be coupled back into waveguides 418 in the reverse direction. In some embodiments, coupling point(s) 420 are formed by providing evanescent coupling (or evanescent-wave coupling) between waveguide 418 and the waveguide forming ring resonator 406. In such embodiments, waveguides 418 may be considered to be evanescently coupled to the waveguide forming ring resonator 406. As noted above, this can be accomplished by bringing one or more portions of waveguides 418 in close proximity (e.g., within a threshold distance) to a portion of the waveguide forming ring resonator 406. In one implementation, the gap between ring resonator 406 and coupling point(s) 420 is between 2-10 µm. In one implementation, the waveguide width of ring resonator 406 is 1.05 µm and its radius is 50 µm. In one implementation, the waveguide width of ring resonator 406 is 1.05 µm and its radius is between 2-3 mm.

In some embodiments, a split detector 426 may be coupled to dark port 430 of upper waveguide 418-2. Split detector 426 is configured to receive the output light and detect an intensity difference S between a first lobe and a second lobe of the output light. Due to the $TM_0$ and $TM_1$ modes acquiring opposite tilted phase fronts in waveguides 418, beam splitter 422 causes destructive interference of the $TM_0$ mode and enhances the relative contribution of the $TM_1$ mode in the output light. Accordingly, a significant portion of the detectable power in the output light resides in the information-containing $TM_1$ mode. In some embodiments, upper waveguide 418-2 may include a multi-mode splitter that splits upper waveguide 418-2 into two separate output ports. In such embodiments, split detector 426 may be configured to receive the output light from both output ports.

FIG. 4B shows the effect of ring resonator 406 and WMA readout structure 408 on the waveguide modes and the phases of light 436 propagating through weak value device 410. In the illustrated example, light 436-1 having a $TE_0$ mode is input into lower waveguide 418-1 at bright port 428. Light 436-1 propagates down lower waveguide 418-1 in the forward direction until reaching beam splitter 422, where it is split (e.g., in a 50/50 split) into light 436-2 propagating down lower waveguide 418-1 in the forward direction and light 436-3 propagating down upper waveguide 418-2 in the forward direction. Each of light 436-2 and light 436-3 includes the $TE_0$ mode.

Light 436-2 reaches lower spatial phase tilter 424-1 and passes therethrough, resulting in light 436-4 propagating down lower waveguide 418-1 in the forward direction and having the $TE_0$ mode, and similarly light 436-3 reaches upper spatial phase tilter 424-2 and passes therethrough, resulting in light 436-5 propagating down upper waveguide 418-2 in the forward direction and having the $TE_0$ mode. In some embodiments, spatial phase tilter's 424 may be designed to have negligible effect on light passing therethrough in the forward direction.

Light 436-4, which is traveling in lower waveguide 418-1 in the forward direction, couples into ring resonator 406 through evanescent coupling at one of coupling point(s) 420 to become either light 436-7, which repeatedly circles ring resonator 406 in the clockwise direction, or light 436-8, which repeatedly circles ring resonator 406 in the counter-clockwise direction, depending on the configuration of coupling point(s) 420. After multiple revolutions around ring resonator 406, light 436-7 or light 436-8 couples back into waveguides 418 through evanescent coupling at one of coupling point(s) 420 to become either light 436-9 traveling in lower waveguide 418-1 in the reverse direction or light 436-10 traveling in upper waveguide 418-2 in the reverse direction.

Similarly, light 436-5, which is traveling in upper waveguide 418-2 in the forward direction, couples into ring resonator 406 through evanescent coupling at one of coupling point(s) 420 to become either light 436-7, which repeatedly circles ring resonator 406 in the clockwise direction, or light 436-8, which repeatedly circles ring resonator 406 in the counter-clockwise direction, depending on the configuration of coupling point(s) 420. After multiple revolutions around ring resonator 406, light 436-7 or light 436-8 couples back into waveguides 418 through evanescent coupling at one of coupling point(s) 420 to become either light 436-9 traveling in lower waveguide 418-1 in the reverse direction or light 436-10 traveling in upper waveguide 418-2 in the reverse direction.

Each of light 436-9 and 436-10 have the $TE_0$ mode. Furthermore, if the weak value device 410 (and consequently the gyroscope) is undergoing a rotation, the two will acquire a relative phase shift $\varphi$ that is imparted by ring resonator 406. For example, light 436-9 may have a phase of $-\varphi$ and light 436-10 may have a phase of $+\varphi$. Light 436-9 reaches lower spatial phase tilter 424-1 and passes therethrough, resulting in light 436-11 propagating down lower waveguide 418-1 in the reverse direction and having the $TE_0$ mode and additionally a $TE_1$ mode that is excited by lower spatial phase tilter 424-1. Similarly, light 436-10 reaches upper spatial phase tilter 424-2 and passes therethrough, resulting in light 436-12 propagating down upper waveguide 418-2 in the reverse direction and having the $TE_0$ mode and additionally the $TE_1$ mode that is excited by upper spatial phase tilter 424-2.

Light 436-11 propagates down lower waveguide 418-1 in the reverse direction until reaching beam splitter 422, where it is split (e.g., in a 50/50 split) and a portion thereof becomes light 436-13 propagating down upper waveguide 418-2 in the reverse direction. Similarly, light 436-12 propagates down upper waveguide 418-2 in the reverse direction until reaching beam splitter 422, where it is split (e.g., in a 50/50 split) and a portion thereof becomes light 436-13 propagating down upper waveguide 418-2 in the reverse direction. Light 436-13 is therefore a combination of the portion of light 436-11 and the portion of light 436-12. The combination of these two light signals causes destructive interference of the base $TE_0$ mode, leaving behind a small portion of the $TE_0$ mode that is proportional to the phase shift $\varphi$. The combination further causes constructive interference of the $TE_1$ mode, such that light 436-13 further includes the $TE_1$ mode.

An analysis of the WMA readout structure 408 along with the other components of the gyroscope follows. It is noted that the mode structure of the traveling electro-magnetic fields is given by the solution to the equation $$\nabla^2 E + n(\omega)^2 k_0^2 E = 0$$

where E is the time and space dependent electric field, $k_0$ is the wavenumber of the light, and $n(\omega)$ is the frequency-dependent index of refraction. Letting z be the direction of propagation, x,y are the transverse directions. The general traveling wave solution takes the form $$E = E_0(x,y) e^{i(\beta z - \omega t)}$$

where $\beta$ is the speed of the wave. The transverse solution then solves the prior equation, which gives an eigenvalue equation for the transverse wave-number k, and relates it to the propagation speed $\beta$.

The effect of the beam-splitter operation with two incoming and two outgoing waveguides can be modeled by defining the incoming electric field modes $\varphi_L$ and $\varphi_R$, where time and space dependence are suppressed for simplicity. By considering the symmetric and anti-symmetric combinations of those modes, $$\varphi_{s,a} = (\varphi_L \pm \varphi_R)/\sqrt{2}$$

these correspond to the eigenstates of the combined modes for a symmetric situation, and these symmetric and anti-symmetric modes travel with speeds $\beta_{s,a}$ that are different from each other.

Considering any combination of the symmetric and anti-symmetric modes, $E = c_s \varphi_s + c_a \varphi_a$, where $c_{s,a}$ are complex coefficients, after propagating some distance $z=L$, corresponding to the coupling region of the two waveguides, the new electric field is $$E' = c_s e^{i\beta s L} \varphi_s + c_a e^{i\beta a L} \varphi_a$$

and thus acquire a relative phase. Obtaining the result back in terms of the left/right basis states and discarding an overall phase, the result is $E^f = c_R \varphi_R + c_L \varphi_L$, where $$c_{R,L} = (e^{iL\Delta\beta} \pm e^{-iL\Delta\beta})/2$$

where $\Delta\beta = \beta_a - \beta_s$. This may be written as $c_R = i \sin(L\Delta\beta/2)$ and $C_L = \cos(L\Delta\beta/2)$. More generally, this process can be considered to be a beam splitter-type relation of the form $$\begin{pmatrix} E_{o1} \\ E_{o2} \end{pmatrix} = \begin{pmatrix} t & k \\ -k* & t* \end{pmatrix} \begin{pmatrix} E_{i1} \\ E_{i2} \end{pmatrix}$$

where $E_{i1,2}$ are the input electric fields, and $E_{o1,2}$ are the output electric fields of the waveguides. The complex coefficients k, t may obey the relation $|k|^2 + |t|^2 = 1$ to ensure uniformity.

Considering a coupling point between a waveguide and the ring resonator, the combined system can be solved by applying the above general result together with boundary conditions linking the output of one scattering waveguide to the input of another as $$E_{t2} = \alpha e^{i(\theta \pm \varphi)} E_{i2}$$

where a accounts for the loss per cycle, the net phase shift is given by $\theta = 2\pi L/\lambda$, which is the geometric phase (where L is the diameter of the ring), and $\varphi = 2\pi l/\lambda$, where/accounts for the Sagnac effect via $l = 2A\Omega/c$, where A is the area of the ring, $\Omega$ is the angular frequency of rotation, and c is the speed of light. The plus or minus sign on the phase $\varphi$ depends on whether the direction of the light propagation is with or against the rotation of the ring.

If the light is incident (i) from either the left (L) or the right (R), the electric field of the light exiting from the ring (t) in the same direction can be found to give $$E_t^{L,R} = (-\alpha + t e^{-i(\theta \pm \varphi)})/(-t*\alpha + e^{-i(\theta \pm \varphi)}) E_i^{L,R}$$

In the interferometric geometry, these fields will be combined. The quality factor Q of the ring resonator can be calculated from the given parameters of the problem in the case of no rotation. It is noted that the power transmitted (related to the squared absolute value of the electric field) will ideally drop to zero at the resonance condition, $\cos(\theta)=1$, since all the power will go into the ring. This corresponds to an integer number of wavelengths of the light fitting inside the ring. Ideally, both $\alpha$ and t would approach 1. Deviations from this limit will give the ring resonator a finite Q value. It can be expanded $\cos(\theta) \approx 1 - (\theta - \theta_0)^2/2$ near the resonance condition (set by $\theta = \theta_0$).

In some embodiments, it can be important to overcouple the ring. To this end, the optimal limit is to define $\delta\alpha = 1 - \alpha$, and $\delta t = 1 - t$, and to take both small, but in the limit $\delta\alpha \ll \delta t \ll 1$, so the ring is in the overcoupled limit in order to allow light to exit the ring and impart a large phase shift to the transmitted light. In this limit, the outgoing electric field may be approximated as $$E_t^{L,R} \approx -\exp\left(\frac{2i(-\theta \mp \phi)}{\delta t}\right) E_i^{L,R}.$$

The cavity resonance effect boosts the acquired phase by a factor of $2/\delta t$. In this limit, the power all comes out of the ring, and only acquires a phase shift. At resonance, $\theta = \theta_r = 2\pi n$, where n is an integer, so $e^{-i\theta} = 1$. However, in what follows, the phase $\theta$ may be modulated in time.

In some instances, the power inside the ring can be considered to highlight the Lorentzian behavior, with the power inside the ring being the incident power $P_{in}$ minus the power transmitted. It can be shown that $$P_{ring} = (1-t^2)(1-\alpha^2)/(1-\alpha t)^2 + \alpha t(\theta - \theta_0)^2 P_{in}$$

If the frequency of the light is detuned by an amount $\delta_\omega = \omega - \omega_n$, from the resonant frequency $\omega_n$ then the phase is $\theta = \delta_\omega L/c$. The quality factor Q may be defined by the ratio between the resonance frequency $\omega_n$ and the width of the resonance $\Delta_\omega$, defined by the Lorentzian shape, $Q = \omega_n/\Delta\omega$.

The width of the resonance may be given by $$\Delta\omega \approx \delta t \cdot c/(2\pi R)$$

and the quality factor may be $$Q = (2\pi)^2 R \sqrt{\alpha t}/\lambda_n \delta t$$

in this limit, where R is the radius of the ring and $\lambda_n$ is the resonance wavelength.

Next, the phase sensitivity of the field for value of t,$\alpha$ near one will be explored. It is assumed that the acquired phase shift $\varphi$ is the smallest parameter in the problem to be sensitive to small rotations. The deviation parameters are defined as $\delta t = 1 - t$, $\delta\alpha = 1 - \alpha$, where it is assumed that $\delta t$, $\delta\alpha$ are small parameters in an expansion. After expansion in these parameters, it is found that the resulting electric fields are $$E_t^{L,R} = 1/(\delta\alpha + \delta t)[\delta\alpha - \delta t + (2\delta t(-i(\theta \pm \varphi) + (\frac{1}{2})(\theta \pm \varphi)^2)/(\delta\alpha - \delta t) + \ldots ] E_t^{L,R}$$

When the system is on-resonance and there is no rotation, the power coming out of the ring is $$P_{out} = (\delta\alpha - \delta t/\delta\alpha + \delta t)^2 P_{in}$$

and thus vanishes if the ring is critically coupled $\alpha = t$, as is verified in the numerical simulations.

It can be seen that the phase shift of the light, depending on direction, is given by $$\Theta_{L,R} = -(\theta \pm \varphi)(2\delta\varphi/(\delta\alpha)2-(\delta t)^2)$$

This leads to a condition in which when the phase amplification is the greatest, the ring is critically coupled, but that is also when no light emerges from the ring. If the ring is resonantly coupled, then the intensity variation between the left and right modes is purely quadratic versus φ, so there is very little variation. The intensity variation with phase is always quadratic, so long as the coupling is not critical, so the magnitude change can be neglected in this limit. The signal-to-noise ratio can be estimated for such a system. The electric fields can be re-exponentiated, so they are approximately given by $E_{L,R} = E_{0e}^{-i\Theta L,R}$, where $E_0 = E_{in}(\delta\alpha - \delta t)/(\delta\alpha + \delta t)$. Looking at the fundamental limits, the sum and difference at a beam-splitter (adding in a phase of $\pi/2$ on one arm) can be taken to get a total intensity in both arms of a Mach-Zehnder interferometer of $$I_{1,2} = I_0(1 \pm \sin(2C_\varphi))/2$$

where $C = 2\delta t/(\delta\alpha^2 - \delta t^2)$ is the phase amplification, and $I_0 = E_0^2$.

Since the phase is small, the difference can be taken as the measured signal, so the information signal is approximately given by $$I_1 - I_2 = 2CI_0\varphi$$

Consequently, the signal-to-noise ratio R is given by $$R = \sqrt{N}(4|\delta\alpha - \delta t|\delta t|/(\delta\alpha + \delta t)^3)\varphi$$

where N is the number of photons in the system. Note that if the system is critically coupled, then the SNR goes to zero. However, the SNR can be increased by avoiding critical coupling. For example, if both δt, δα are similar small numbers ε, then the SNR scales with R~1/ε, which is expected for a regular ring, where the pre-factor is a number of order 1. In some cases, it is desirable to keep δt small and finite, while letting δα go to 0, which may correspond to the over-coupled case with an SNR of $R = 4\sqrt{N}/\delta t$. Since the quality factor in that case is $Q = (2\pi)^2 R/(\delta t \lambda)$, the best case SNR can be written in terms of quality factor (in the limit of a lossless ring) as $$R = (\sqrt{N}(Q\lambda)/(\pi^2 R))\varphi$$

This corresponds to a minimal phase resolution found by setting the SNR=1, and solving for the smallest detectable phase to yield $$\varphi_{min} = \pi^2 R/(\sqrt{N}Q\lambda)$$

This can be converted into a minimal angular frequency relation via the Sagnac relation, $$\Omega_{min} = c/(4RQ\sqrt{N})$$

where the area $A = \pi R^2$. Thus, the best case scenario is to maximize the product of the radius of the ring times its quality factor.

The PDH technique is based on putting sidebands on the laser signal, and then feedback back on the laser with a demodulated difference signal. Consider the initial input electric field $$E_i = E_{0e}^{iwt + \phi(t)},$$

where the optical phase φ(t) is modulated weakly and slowly as $$\phi(t) = \phi_0 \sin(\omega_m t)$$

through (for example) by a local oscillator and an electro-optic modulator, as shown in FIG. 3.

The electric field may be expanded to first order in the weak phase modulation do to find, $$E_i = E_{0e}^{i\omega t}[1 + (\phi_0/2)e^{iw_m t} - (\phi_0/2)e^{-i\omega_m t}]$$

The transfer function of the ring resonator can be defined to be T (@), such that $$T(\omega) = \frac{E_f(\omega)}{E_i(\omega)}.$$

This quantity for the system can be found to be $$T_\pm(\omega) = \frac{-\alpha + te^{-i(\theta(\omega) \pm \phi)}}{-t^*\alpha + e^{-i(\theta(\omega) \pm \phi)}}$$

where the ±indicates a clockwise or counterclockwise rotation. The important effect is that the resonance angle $\theta(\omega) = 2\pi C/\lambda = \omega C/c$ depends on the optical frequency ω, where C is the circumference of the ring. The ring resonator is a passive, linear device so the driving the resonator at the three frequencies can be superimposed linearly to find $$E_{t,\pm}(\omega) = E_0\left[T_\pm(\omega)e^{iwt} + \left(\frac{\phi_0}{2}\right)T_\pm(\omega - \omega_m)e^{i(\omega + \omega_m)t} - \left(\frac{\phi_0}{2}\right)T_\pm(\omega - \omega_m)e^{i(\omega - \omega_m)t}\right].$$

This has the effect of adding sidebands to the carrier at $\pm\omega_m$. If the electric field signal is tracked as it propagates through the interferometer, a portion of the light is tapped out and then reinjected after the waveguide has broadened. Defining the $TE_0$ mode as the fundamental mode after the waveguide has broadened, the electric fields in the two waveguides can be expressed as $$E_1(x, \omega) = E_{t,+}(\omega)TE_0(x)/\sqrt{2}$$

$$E_2(x,\omega) = E_{t,-}(\omega) TE_0(x)/\sqrt{2}$$

These states are now coupled to the first order mode with coupling degree α, to give the multimode states with opposite signs in the coefficients of the first order mode, $$E_1(x,\omega) = E_{t,+}(\omega)((1-\alpha)TE_0(x) + i\alpha TE_1(x))/\sqrt{2}$$

$$E_2(x,\omega) = E_{t,-}(\omega)((1-\alpha)TE_0(x) - i\alpha TE_1(x))/\sqrt{2}$$

This is done with the auxiliary tapered waveguides. Finally these two waveguides combine at the 50/50 multimode beamsplitter to produce the states in the two other waveguides, the "bright" and "dark" modes, $$E_d = \frac{E_1 - E_2}{\sqrt{2}} = (1-\alpha)TE_0(x)\frac{E_{t,+}(\omega) - E_{t,-}(\omega)}{2} + i\alpha TE_1(x)\frac{E_{t,+}(\omega) + E_{t,-}(\omega)}{2}$$

$$E_b = \frac{E_1 - E_2}{\sqrt{2}} = (1-\alpha)TE_0(x)\frac{E_{t,+}(\omega) + E_{t,-}(\omega)}{2} + i\alpha TE_1(x)\frac{E_{t,+}(\omega) - E_{t,-}(\omega)}{2}$$

The inverse weak value limit can be considered, where the phase is the smallest quantity considered, but a is also a small parameter. In this limit, because $E_{t,+}$ and $E_{t,-}$ have opposite dependencies on the phase, the dark mode contains nearly all the information about the acquired phase, while the bring port contains almost none, as usual.

Consequently, the dark port can be used to make a sensitive measurement about the phase, while the bright port light can be used to form the feedback signal to stabilize the laser. One might be concerned at this point that the rotation signal contained in the acquired phase, showing up the first order in $E_{t,+}(\omega)-E_{t,-}(\omega)$, but not in the $E_{t,+}(\omega)+E_{t,-}(\omega)$ might spoil the PDH method, because the feedback protocol may try to lock on to the signal one is measuring, rather than the fluctuations of the laser frequency. Fortunately, this dependence is suppressed by a factor of a in the bright port. As an additional feature, although the dependence on the phase is very weak in the bright port, the bright port waveguide can be tapered down in size, as described herein. This has the effect that the $TE_1$ mode is no longer supported, and consequently, all light in that mode is dissipated out of the waveguide, leaving behind only $TE_0$ mode, which has only a weak quadratic correction in the phase to the dominate amplitude. The fact this is the bright port allows good signal to feed into the feedback loop. As described herein, the proposed geometry uses a circulator to send the returning light out of the bright port to a separate optical fiber, where it is detected with a photodiode.

The power detected by the photodiode in the bring port is proportional to the squared electric field, integrated over the transverse distance of the waveguide, $$P_b(\omega) = P_0 \left| \frac{E_{t,+}(\omega) + E_{E_{t,-}}(\omega)}{2} \right|^2 \approx P_0 |E_t(\omega)|^2,$$

where $P_0$ is the overall power in the bright port, which is close to the input power, Here, $E_t(\omega)$ is the transmitted electric field amplitude without any rotation phase $\phi$. Inserting the previous expression for $E_{t,\pm}(\omega)$, the result is $$P_{b(\omega)} = P_0 |T(\omega)|^2 + P_0 \frac{\phi_0^2}{4} \left( |T(\omega + \omega_m)|^2 + |T(\omega - \omega_m)|^2 \right) +$$

$$P_0 \phi_0 [\text{Re}[X(\omega)]\cos(\omega_m t) + \text{Im}[X(\omega)]\sin(\omega_m t)],$$

where terms are dropped that oscillate like $2\omega_m t$, and have defined $X(\omega)$ as $X(\omega)=T(\omega)T^*(\omega+\omega_m)-T^*(\omega-\omega_m).$ It is noted that X is an antisymmetric function of $\omega-\omega_r$, or where $\omega_r$ is the resonance frequency. From the power in the bright port, it can be seen that if the power is demodulated at the frequency $\omega_m$, the signal at that frequency gives access to the real and imaginary parts of X. This is conveniently done with the original signal from the phase modulator (see FIG. 3). By making a phase shifted signal by $\varphi$, a voltage signal is produced, $V(t)=V_0 \cos(\omega_m t+\varphi)$ which is then mixed with the voltage signal from the photodiode $V_b$ (proportional to the optical power incident on it) to produce a signal proportional to the product of the inputs. Using the trigonometric identities $2\cos A \cos B = \cos (A+B)+\cos (A-B)$ $2\sin A \cos B = \sin (A+B)+\sin (A-B),$ together with a low pass filter to eliminate signals oscillating at frequencies $\omega_m$, $2\omega_m$, or higher, one can obtain only the low frequency signal proportional to $S=\text{Re}[X(\omega)]\cos \varphi+\text{Im}[X(\omega)]\sin \varphi.$ In practice, cavity feedback is arranged such at the carrier frequency is near the cavity resonance, but the modulation is sufficiently fast that the sidebands are away from resonance. In this case, the sidebands are entirely transmitted, $T(\omega\pm\omega_m)\approx 1$ so the X function takes the form $X(\omega)\approx 2i\text{Im}T(\omega).$ These results can be illustrated with the limiting case where $\delta t$ is taken to be small and $\delta\alpha$ is approximated as $\delta\alpha=0$, the lossless case, for simplicity. In this limit, the transfer function is given by $$T = \frac{-1 + (1-\delta t)e^{-i\theta}}{-1 + \delta t + e^{-i\theta}}.$$

Figure 10A:
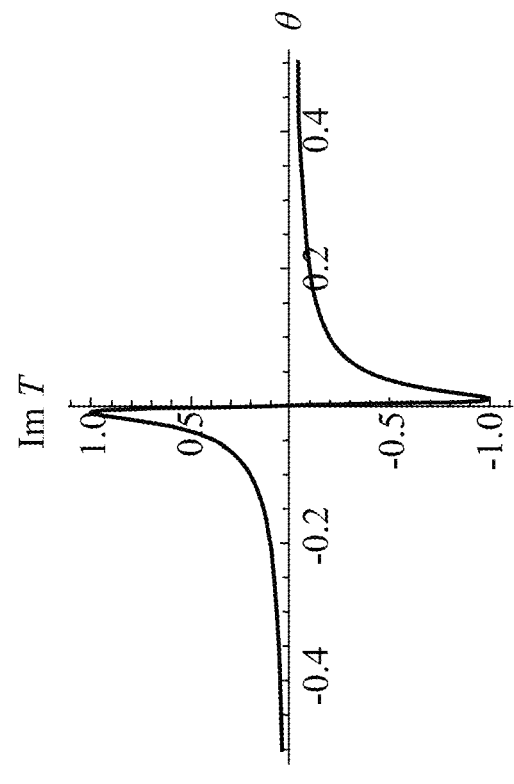
FIGS. 10A and 10B illustrate plots showing the real and imaginary parts of T, respectively, as a function of angle according to some embodiments of the present invention.
Figure 10B:
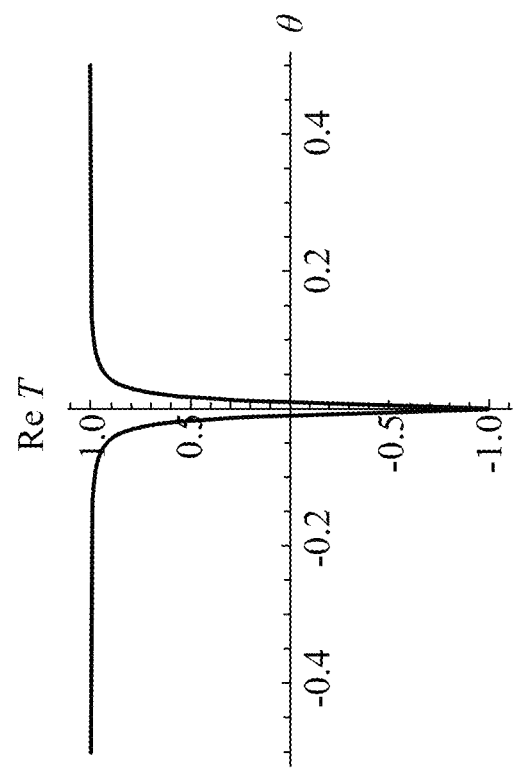
Figure 11:
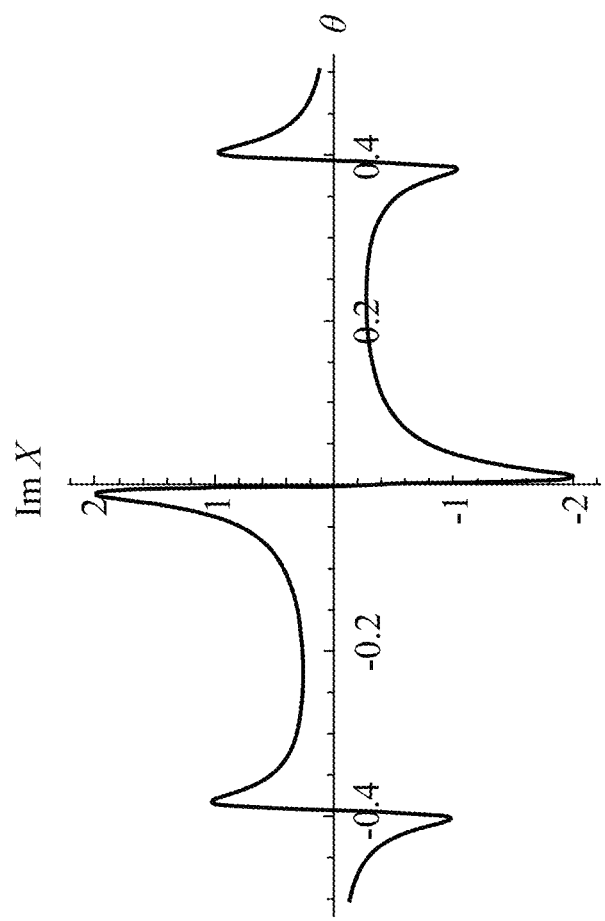
FIG. 11 illustrates a plot that shows the imaginary part of $X(\omega)$ as a function of frequency according to some embodiments of the present invention.

Here, $\theta(\omega)=\omega C/c$, is the frequency dependence, where C is the circumference of the ring. The resonances are at multiples of $2\pi$, and the focus here is on the $\theta=0$ resonance. Since it is in the overcoupled limit, the power all leaves the ring, so $|T|^2=1$. Nevertheless, the real and imaginary parts of T change rapidly as the frequency passes through the resonance. In FIGS. 10A and 10B, the real and imaginary parts of T are plotted, respectively, as a function of angle $\theta$ for the specific choice of $\delta t=0.01$. In FIG. 10A, it can be observed that the real part rapidly shifts from +1 to −1 and back at the angle scale of $\delta t$. In FIG. 10B, it can be observed that the imaginary part rapidly goes through zero. This sharp dependence permits good stabilization of the laser signal. In FIG. 11, the imaginary part of $X(\omega)$ is plotted versus frequency for the specific choice of modulation frequency corresponding to $\theta_m=\omega_m C/c=\pi/8$. This illustrates that close to the resonance frequency, the behavior of X is similar to twice the imaginary part of T. Finally, it can be checked numerically that the behavior of $(T_++T_-)/2$ is quite similar to T for sufficiently small vales of $\phi$, enabling good stabilization of the laser frequency. For the signal measurement, it may be important to take only the dark port difference signal at the resonance frequency, which is then controlled by the rotation phase, with linear response given by $2/\delta t$, which is weak value amplified.

As described herein, in some embodiments, a servo can control the laser resonance condition. This can be done in different ways depending on the type of laser. For a tabletop laser, the frequency can be fine-tuned by applying a voltage to the piezo that changes laser cavity length through a tuning port. For a diode laser, this is usually done through an electrical current or sometimes temperature control to correct the drifting laser frequency. The error signal produced in FIG. 11 can be directly fed back into the diode laser to stabilize it, as depicted in FIG. 3.

FIGS. 5A, 5B, and 5C illustrate example architectures of a weak value device 510, according to some embodiments of the present invention. In each of the illustrated examples, weak value device 510 includes a ring resonator 506, heaters 540, a WMA readout structure 508, waveguides 518, a beam splitter 522, spatial phase tilter(s) 524, a bright port 328, and a dark port 530. In the example of FIG. 5A, WMA readout structure 508 includes two coupling points 520 along waveguides 518 where light in waveguides 518 traveling in the forward direction is coupled into ring resonator 506 and light circling ring resonator 506 is coupled back into waveguides 518 in the reverse direction. In the example of FIG. 5A, coupling points 520 include a lower coupling point 520-1, where lower waveguide 518-1 is evanescently coupled to ring resonator 506, and an upper coupling point 520-2, where upper waveguide 518-2 is evanescently coupled to ring resonator 506. In the example of FIG. 5A, waveguides 518 remain unconnected.

In the example of FIG. 5B, WMA readout structure 508 includes a single coupling point 520 along waveguides 518 where light in waveguides 518 traveling in the forward direction is coupled into ring resonator 506 and light circling ring resonator 506 is coupled back into waveguides 518 in the reverse direction. In the example of FIG. 5B, waveguides 518 are connected together, essentially forming a single waveguide. The example of FIG. 5C has a single coupling point 520, similar to FIG. 5B, and further illustrates possible relative waveguide widths for various elements. The example of FIG. 5C shows a bright port tapering 576 that may be formed along lower waveguide 518-1 between bright port 528 and beam splitter 522. In the example of FIG. 5C, a multimode splitter 546 is formed along upper waveguide 518-2 that performs multi-mode splitting, resulting in a lower dark port 530-1 and an upper dark port 530-2.

Figure 5D:
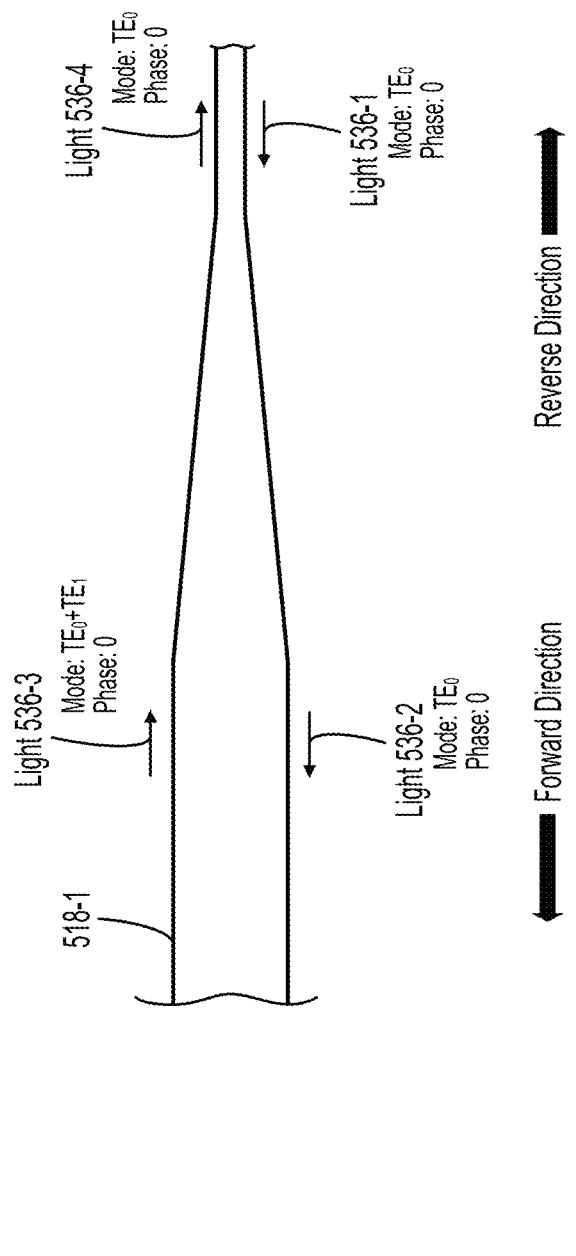
FIG. 5D illustrates an example of a bright port tapering according to some embodiments of the present invention.

FIG. 5D illustrates an example of bright port tapering 576, according to some embodiments of the present invention. In the illustrated example, lower waveguide 518-1 slowly widens moving in the forward direction and slowly narrows moving in the reverse direction. During operation, light 536-1 (i.e., input light) having a $TE_0$ mode is input into lower waveguide 518-1 at the bright port 528 and propagates down lower waveguide 518-1 in the forward direction as the waveguide widens, continuing to have a $TE_0$ mode as light 536-2. In the reverse direction, light 536-3 having a $TE_0$ mode and a (perhaps minimal) $TE_1$ mode propagates down lower waveguide 418-1 in the reverse direction as the waveguide narrows, causing the $TE_1$ to be removed. Accordingly, tapering the bright port waveguide can remove any residual $TE_1$ component and can further make the bright port independent of the rotation phase.

Figure 6:
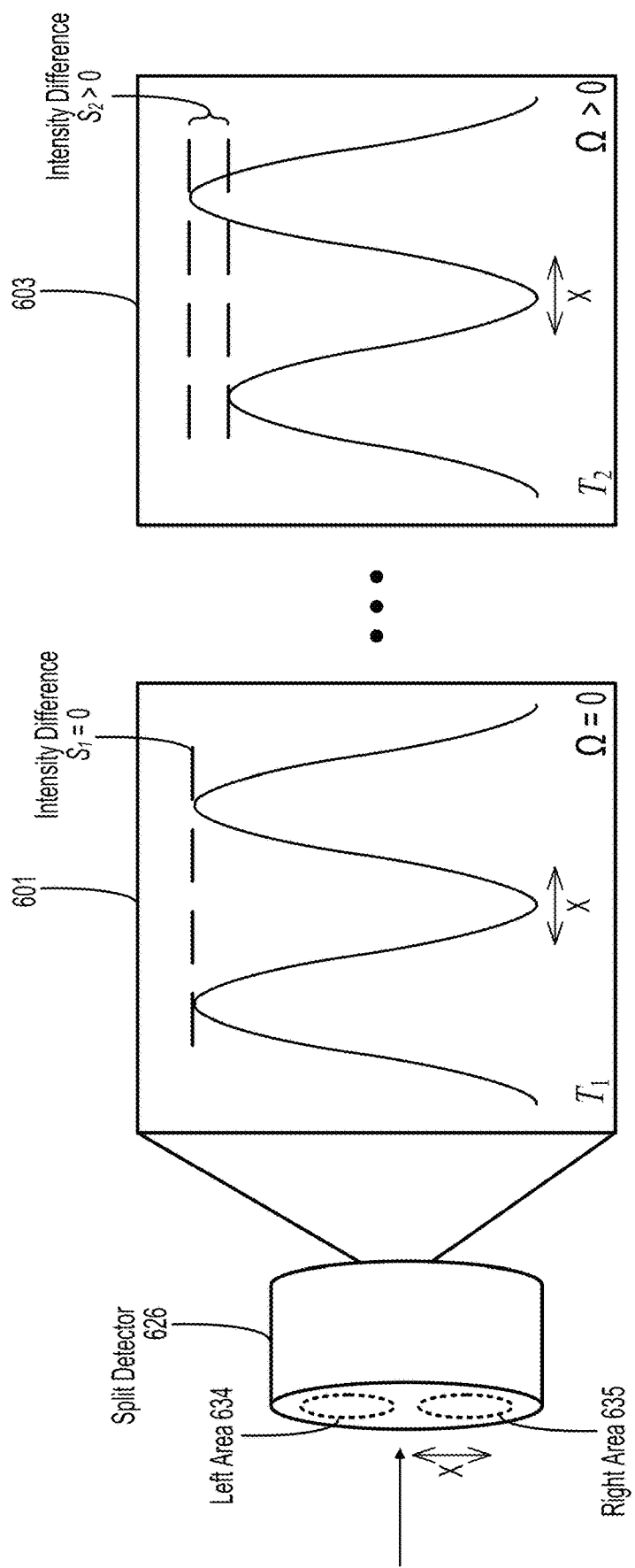
FIG. 6 illustrates an example of detecting an intensity difference of output light at a split detector according to some embodiments of the present invention.

FIG. 6 illustrates an example of a detection of the intensity difference S of the output light by split detector 626, according to some embodiments of the present invention. In some embodiments, the intensity difference S may be calculated as $S=I_R-I_L$, where $I_R$ is the intensity of the right half of the waveguide and $I_L$ is the intensity of the left half of the waveguide. In some embodiments, the intensity difference S' may be calculated as $S=(I_R-I_L)/(I_R+I_L)$. Split detector 626 may include a left area 634 and a right area 635 for detecting intensities $I_L$ and $I_R$, respectively. In some embodiments, the intensity difference S may be a function of the phase shift φ. Upon solving for the phase shift φ, the rotation Ω of the gyroscope may be calculated. In the illustrated embodiment, an intensity difference of $S_1=0$ detected at time $T_1$ is shown in profile 601, and an intensity difference of $S_2>0$ detected at time $T_2$ is shown in profile 603.

Figure 7:
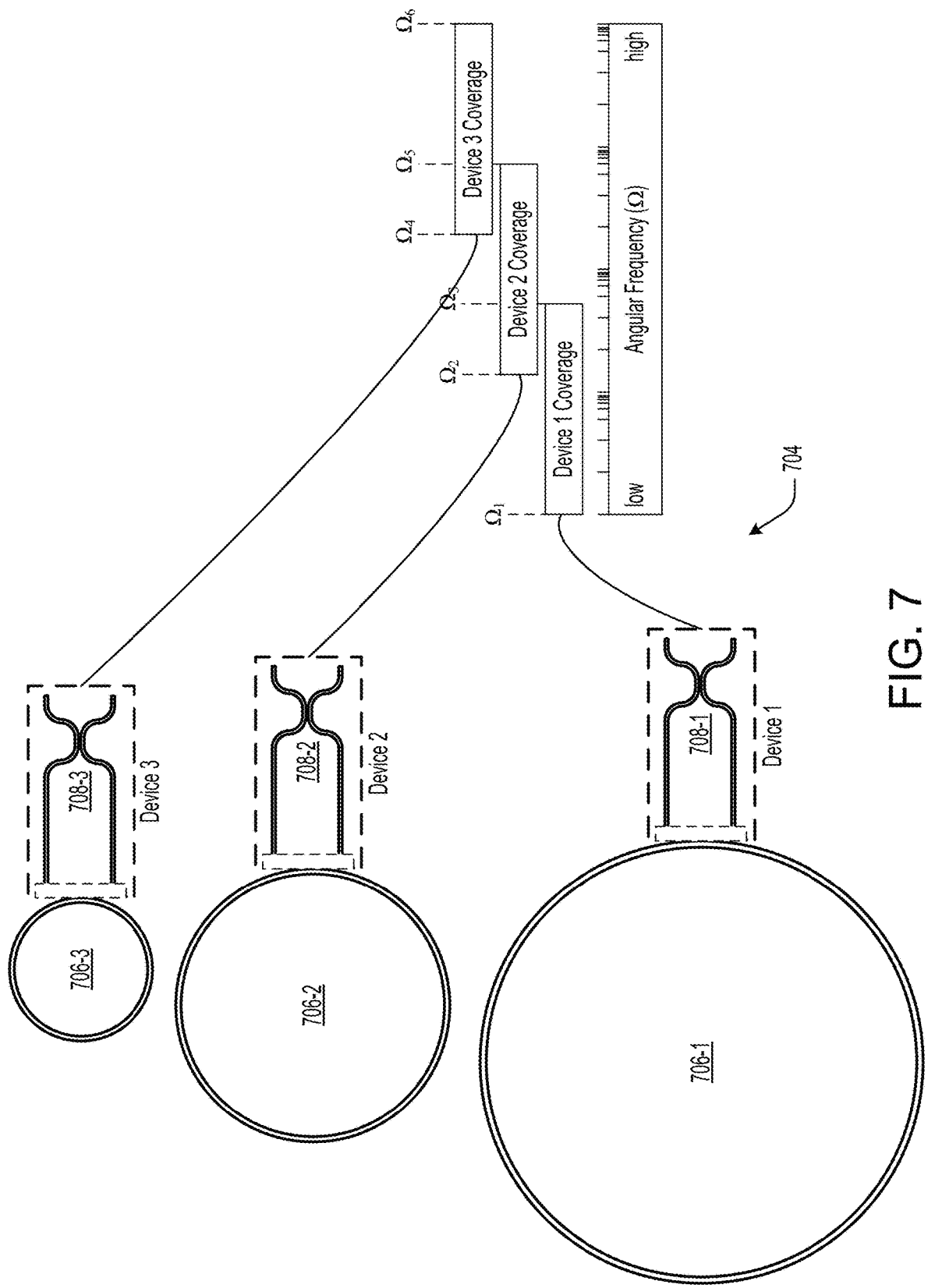
FIG. 7 illustrates an example of a gyroscope that includes multiple sets of ring resonators and WMA readout structures according to some embodiments of the present invention.

FIG. 7 illustrates an example of a gyroscope 704 (or photonic device) that includes multiple sets of ring resonators 706 and WMA readout structures 708, according to some embodiments of the present invention. FIG. 7 shows how a gyroscope (or photonic device) can be fabricated using the described techniques to be sensitive to different scales of rotation. In some instances, as the ring resonator becomes larger and has a higher quality, the device's sensitivity to the rotation increases and the dynamic range decreases. As such, different ring resonators can be used to cover different frequency ranges. For example, Device 1 can be used for detecting angular frequencies between $\Omega_1$ and $\Omega_2$, both Devices 1 and 2 can be used to detect frequencies between $\Omega_2$ and $\Omega_3$, Device 2 can be used to detect frequencies between $\Omega_3$ and $\Omega_4$, both Devices 2 and 3 can be used to detect frequencies between $\Omega_4$ and $\Omega_5$, and Device 3 can be used to detect frequencies between $\Omega_5$ and $\Omega_6$. A controller that is electrically coupled to gyroscope 704 may be configured to switch between the devices based on which of these ranges the detected angular frequency falls within.

A rotation of an optical loop, oriented in the direction of rotation, gives rise to the Sagnac effect, whereby a relative phase φ appears because of the rotation rate Ω. Physically this phase shift can be seen as a relative delay/advance of the two propagating waves. Given an optical wavelength λ and a loop area A, it is given by $$\varphi_{min} = \frac{8\pi A}{\lambda c}\Omega$$

where c is the speed of light in vacuum.

Normally, the dynamic range is bounded by the fact the phase φ will wrap around 2π, so the device will give the same output for Ω and for $\Omega+2\pi(\lambda c/(8\pi A))$. Consequently, without tracking the history of the signal, this can lead to multi-valued ambiguity problems. However, for weak value type amplification systems, the conditions for the validity of the approximations of the analysis are also obeyed, which are also coordinated with for the linear response of the device with respect to phase. The condition φ<<κ<<1 is also obeyed, where κ is the admixture of the first mode. In typical experiments, κ is expected to be between $1/100$ and $1/10$, so the dynamic range can be considered to be $\varphi<10^{-2}$ in some embodiments. In addition, the fact may be considered that the acquired phase is not just the Sagnac phase, but has an additional enhancement of 1/δt, where δt is the deviation of the ring transmission coefficient from 1, leading to many cycles of the light around the ring. A typical value can be $\delta t=10^{-2}$. This further reduces the dynamic range to stay in the weak value approximation by a combined factor of $10^{-4}$.

In some embodiments, a wavelength of λ=1500 nm may be considered. In this case, the dynamic range of the detector is $$\Omega_{dr}=0.00059/r^2 \text{ rad } m^2/s$$

If a large ring radius of 3 cm is included, that gives a dynamic range of 0.65 rad/s, which is about 40 degrees a second, which is fairly large. By making the radius smaller, it can be seen from the previous equation that the dynamic range can be made much larger. This suggests making a number of devices of varying sizes. By increasing the radius of the device on a logarithmic scale, the dynamic range can increase logarithmically. This can correspond to mapping out the "digits" of a large angular velocity, where the smallest rings measure the largest digits, and the largest rings measure the smallest digits. The dependence on radius is quadratic, so small changes in radius can correspond to significant changes in angular velocity.

Figure 8:
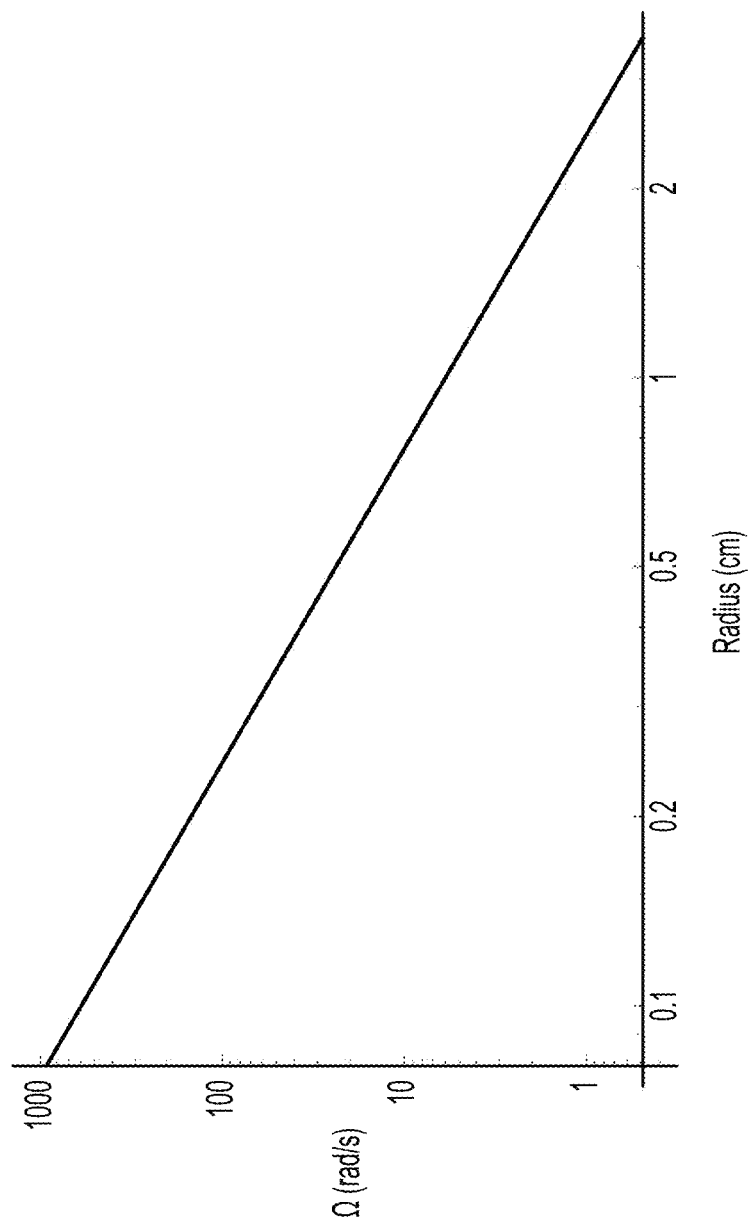
FIG. 8 illustrates a plot of the dynamic range of the angular velocity of a gyroscope device versus ring radius according to some embodiments of the present invention.

FIG. 8 illustrates a log-log plot of the dynamic range of the angular velocity (in rad/s) of a gyroscope device versus ring radius (in cm), according to some embodiments of the present invention. As shown in FIG. 8, three decades of angular velocity can be covered with ring radii between just less than 1 mm to 3 cm. For example, the table below shows different selected ring radii to hit each digit of the dynamic range.

| $\Omega_{dr}$ (rad/s) | 1 | 10 | 100 | 1000 |
|---|---|---|---|---|
| r (cm) | 2.4 | 0.76 | 0.24 | 0.077 |

FIG. 9 illustrates a microscope image of an example of a gyroscope 904 (alternatively referred to as a photonic device) having been fabricated with ring resonators 906 and the various waveguides on the same layer, according to some embodiments of the present invention. Each of the three sets of structures of gyroscope 904 (with each structure including one of ring resonators 906 and a corresponding WMA readout structure) may be similar to the WMA readout structures described herein. For example, each of the structures may include a ring resonator 906 (being either 25 µm, 50 µm, or 100 µm as indicated in FIG. 9), waveguides 918, a beam splitter 922, spatial phase tilter(s) 924 (also referred to as phase front tilters), and a bright port 928.

Each of the WMA readout structures may also include a multimode splitter 946 positioned at upper waveguide 918-2 that performs multi-mode splitting, resulting in a lower dark port 930-1 and an upper dark port 930-2. Each of the WMA readout structures further includes one or more coupling points 920 along waveguides 918 where light in waveguides 918 traveling in the forward direction is coupled into ring resonator 906 and light circling ring resonator 906 is coupled back into waveguides 918 in the reverse direction.

FIGS. 10A and 10B illustrate plots showing the real and imaginary parts of T, respectively, as a function of angle θ for δt=0.01, according to some embodiments of the present invention. As described above, FIG. 10A shows that the real part of T rapidly shifts from +1 to −1 and back at the angle scale of δt. FIG. 10B shows that the imaginary part rapidly moves through zero, where the sharp dependence permits good stabilization of the laser signal.

FIG. 11 illustrates a plot that shows the imaginary part of X(ω) as a function of frequency for the specific choice of modulation frequency corresponding to $\theta_m=\omega_m C/c=\pi/8$, according to some embodiments of the present invention. As described above, this illustrates that close to the resonance frequency, the behavior of X is similar to twice the imaginary part of T.

Figure 12:
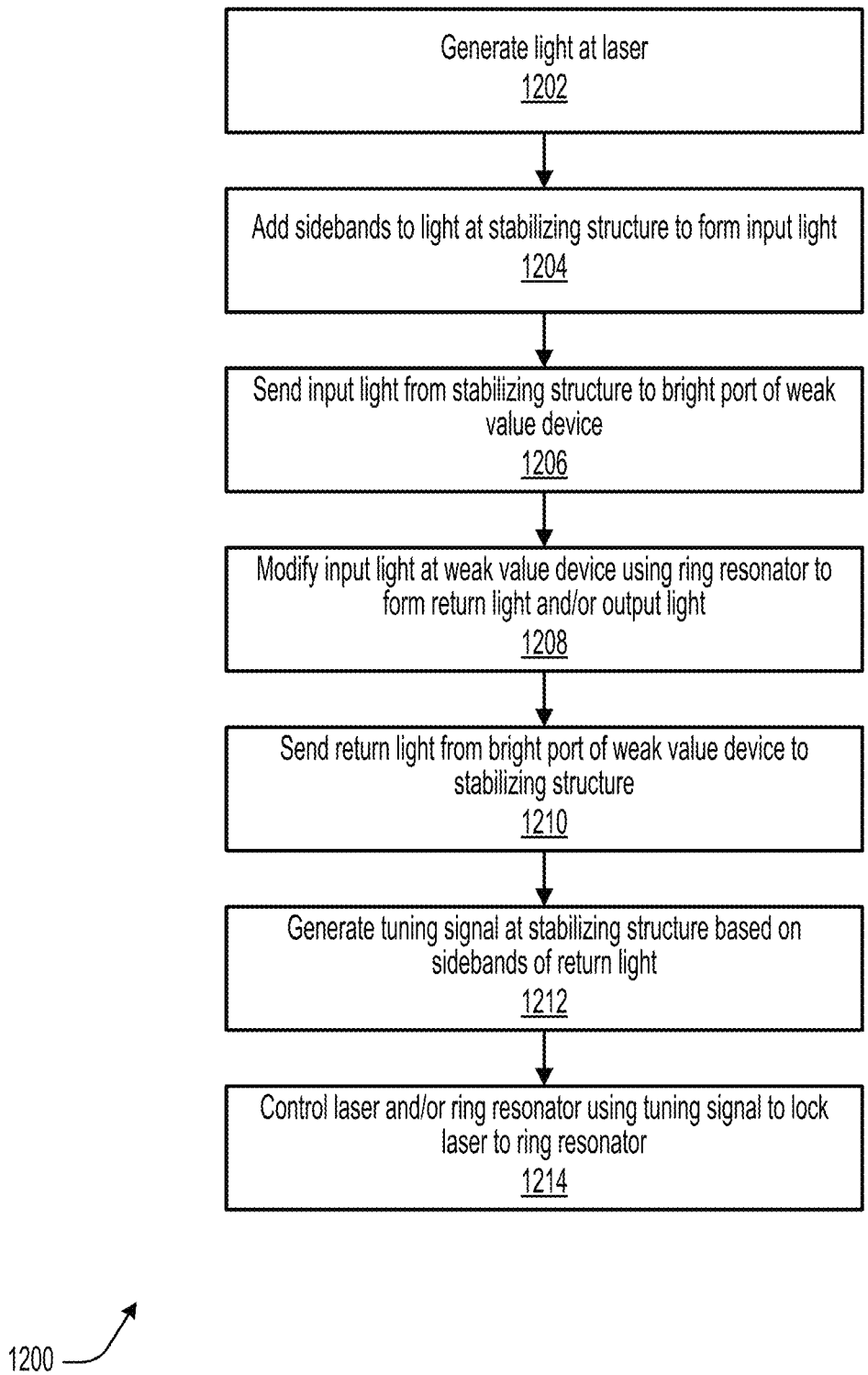
FIG. 12 illustrates an example of a method of locking a laser to a ring resonator of a weak value device according to some embodiments of the present invention.

FIG. 12 illustrates an example of a method 1200 of locking a laser to a ring resonator of a weak value device, according to some embodiments of the present invention. One or more steps of method 1200 may be omitted during performance of method 1200, and steps of method 1200 need not be performed in the order shown. One or more steps of method 1200 may be performed by or initiated by one or more processors. Method 1200 may be implemented as a computer-readable medium or computer program product comprising instructions which, when the program is executed by one or more computers, cause the one or more computers to carry out the steps of method 1200. Such computer program products can be transmitted, over a wired or wireless network, in a data carrier signal carrying the computer program product.

At step 1202, light (e.g., light 236, 336, 436, 536) is generated at a laser (e.g., lasers 132, 232, 332).

At step 1204, sidebands are added to the light at a stabilizing structure (e.g., frequency stabilizers 150, 250, 350) to form input light (e.g., 236-2, 336-3, 436-1, 536-1).

At step 1206, the input light is sent from the stabilizing structure to a bright port (e.g., bright ports 228, 328, 428, 528, 928) of a weak value device (e.g., weak value devices 110, 210, 310, 410, 510). The weak value device may include a readout structure (e.g., WMA readout structures 108, 208, 408, 508, 708) and a ring resonator (e.g., ring resonators 106, 206, 406, 506, 706, 906). The weak value device may include the bright port and a dark port (e.g., dark ports 230, 330, 430, 530, 930) that is separate from the bright port.

At step 1208, the input light is modified at the weak value device using the ring resonator to form return light (e.g., light 236-3, 336-4, 436-14, 536-4). In some embodiments, modifying the input light at the weak value device using the ring resonator may further form output light (e.g., light 236-4, 236-5, 336-6, 336-7, 436-13) that is different than the return light. The weak value device may output the output light at the dark port. The output light may be detected by a detector (e.g., detectors 226, 326, 426, 626) that is optically coupled to the dark port.

At step 1210, the return light is sent from the bright port of the weak value device to the stabilizing structure.

At step 1212, a tuning signal (e.g., tuning signals 252, 352) is generated at the stabilizing structure based on the sidebands of the return light.

At step 1214, one or both of the laser or the ring resonator is controlled using the tuning signal to lock a frequency of the laser to a resonance frequency of the ring resonator. In some embodiments, the tuning signal may cause the frequency of the laser to increase or decrease towards the resonance frequency of the ring resonator. In some embodiments, the tuning signal may cause the resonance frequency of the ring resonator to increase or decrease towards the frequency of the laser by, for example, causing a temperature of a set of heaters (e.g., heaters 440, 540) thermally coupled to the ring resonator to increase or decrease.

In some embodiments, the laser, the stabilizing structure, the weak value device, and the detector may be elements of a photonic device such as a gyroscope (e.g., gyroscopes 104, 204, 304). In some embodiments, the gyroscope may be an element of an IMU (e.g., IMU 100), which may further comprise an accelerometer (e.g., accelerometer 102).

Figure 13:
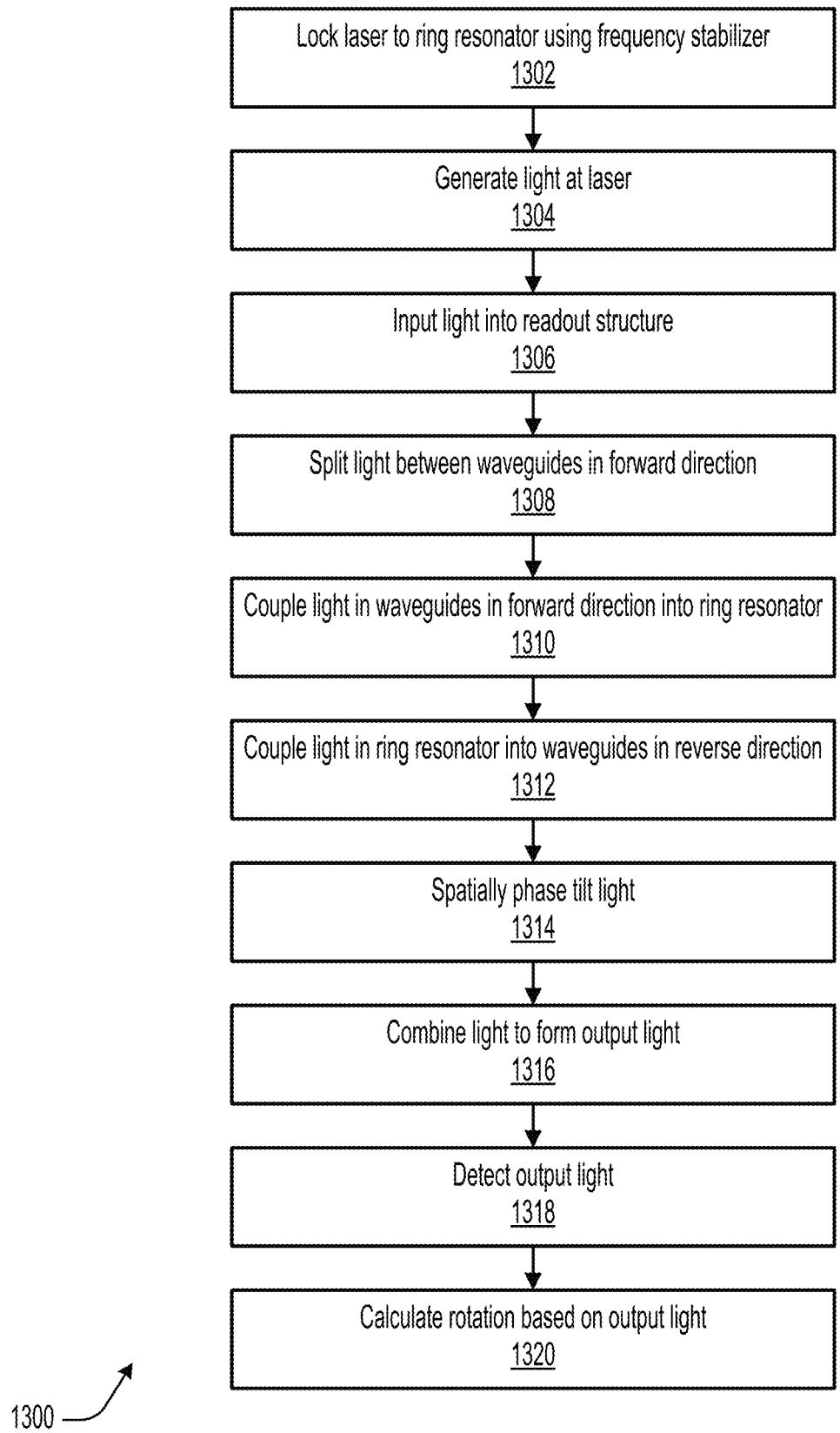
FIG. 13 illustrates an example of a method for detecting a rotation of a photonic device according to some embodiments of the present invention.

FIG. 13 illustrates an example of a method 1300 for detecting a rotation of a photonic device, according to some embodiments of the present invention. One or more steps of method 1300 may be omitted during performance of method 1300, and steps of method 1300 need not be performed in the order shown. One or more steps of method 1300 may be performed by or initiated by one or more processors. Method 1300 may be implemented as a computer-readable medium or computer program product comprising instructions which, when the program is executed by one or more computers, cause the one or more computers to carry out the steps of method 1300. Such computer program products can be transmitted, over a wired or wireless network, in a data carrier signal carrying the computer program product.

At step 1302, a laser (e.g., lasers 132, 232, 332) may be locked to a ring resonator (e.g., ring resonators 106, 206, 406, 506, 706, 906) of a weak value device (e.g., weak value devices 110, 210, 310, 410, 510). Step 1302 may include one or more steps of method 1200.

At step 1304, light (e.g., light 236, 336, 436, 536) is generated at the laser.

At step 1306, the light is inputted into a readout structure (e.g., WMA readout structures 108, 208, 408, 508, 708) of the weak value device. The weak value device may include a bright port (e.g., bright ports 228, 328, 428, 528, 928) and a dark port (e.g., dark ports 230, 330, 430, 530, 930). The light may be inputted at the bright port that is coupled to a lower waveguide (e.g., lower waveguides 418-1, 518-1, 918-1) of the readout structure. In some embodiments, the light may include a $TE_0$ mode.

At step 1308, the light is split between the lower waveguide and an upper waveguide (e.g., upper waveguides 418-2, 518-2, 918-2) of the readout structure and travels in a forward direction. In some embodiments the light may be split by a beam splitter (e.g., beam splitters 422, 522, 922).

At step 1310, the light in the lower waveguide traveling in the forward direction and the light in the upper waveguide traveling in the forward direction are coupled into a ring resonator (e.g., ring resonators 106, 206, 406, 506, 706, 906) at one or more coupling points (e.g., coupling points 420, 520, 920). The one or more coupling points may support evanescent coupling between the waveguides and the ring resonator. In some embodiments, the one or more coupling points may include a single coupling point at which the lower waveguide and the upper waveguide are connected. In some embodiments the one or more coupling points may include two coupling points, and the lower waveguide and the upper waveguide may remain unconnected.

At step 1312, the light in the ring resonator is coupled back into the lower waveguide and the upper waveguide in a reverse direction at the one or more coupling points. In some embodiments, the light in the ring resonator may be coupled back into the waveguides after the light has circled the ring resonator during multiple revolutions. In some embodiments, a portion of the light may circle the ring resonator in the clockwise direction and another portion of the light may circle the ring resonator in the counter-clockwise direction. In some embodiments, due to rotation of the gyroscope, the ring resonator imparts a relative phase shift between the light traveling in the clockwise direction and the light traveling in the counter-clockwise direction, which is continued with the light in the lower waveguide traveling in the reverse direction and the light in the upper waveguide traveling in the reverse direction.

At step 1314, one or both of the light in the lower waveguide and the light in the upper waveguide are spatially phase tilted by one or more spatial phase tilters (e.g., spatial phase tilters 424, 524, 924). In some embodiments, one or both of the light the lower waveguide traveling in the reverse direction and the light in the upper waveguide traveling in the reverse direction may be spatially phase tilted. In some embodiments, the one or more spatial phase tilters may include a lower spatial phase tilter formed on the lower waveguide and/or an upper spatial phase tilter formed on the upper waveguide. In some embodiments, the one or more spatial phase tilters may excite a $TE_1$ mode to the light passing therethrough.

At step 1316, the light in the lower waveguide traveling in the reverse direction and the light in the upper waveguide traveling in the reverse direction are combined to form output light (e.g., light 236-4, 236-5, 336-6, 336-7, 436-13). In some embodiments, the two light signals are combined at the beam splitter. In some embodiments, combining the light causes destructive interference of the base $TE_0$ mode and/or constructive interference of the $TE_1$ mode.

At step 1318, the output light is detected. In some embodiments the output light may be detected using a detector (e.g., detectors 226, 326, 426, 626) that is optically coupled to the dark port.

At step 1320, the rotation of the photonic device is calculated based on the output light. In some embodiments, the rotation is calculated based on an analysis of the output light that includes determining an intensity difference between a first lobe and a second lobe of the output light.

Figure 14:
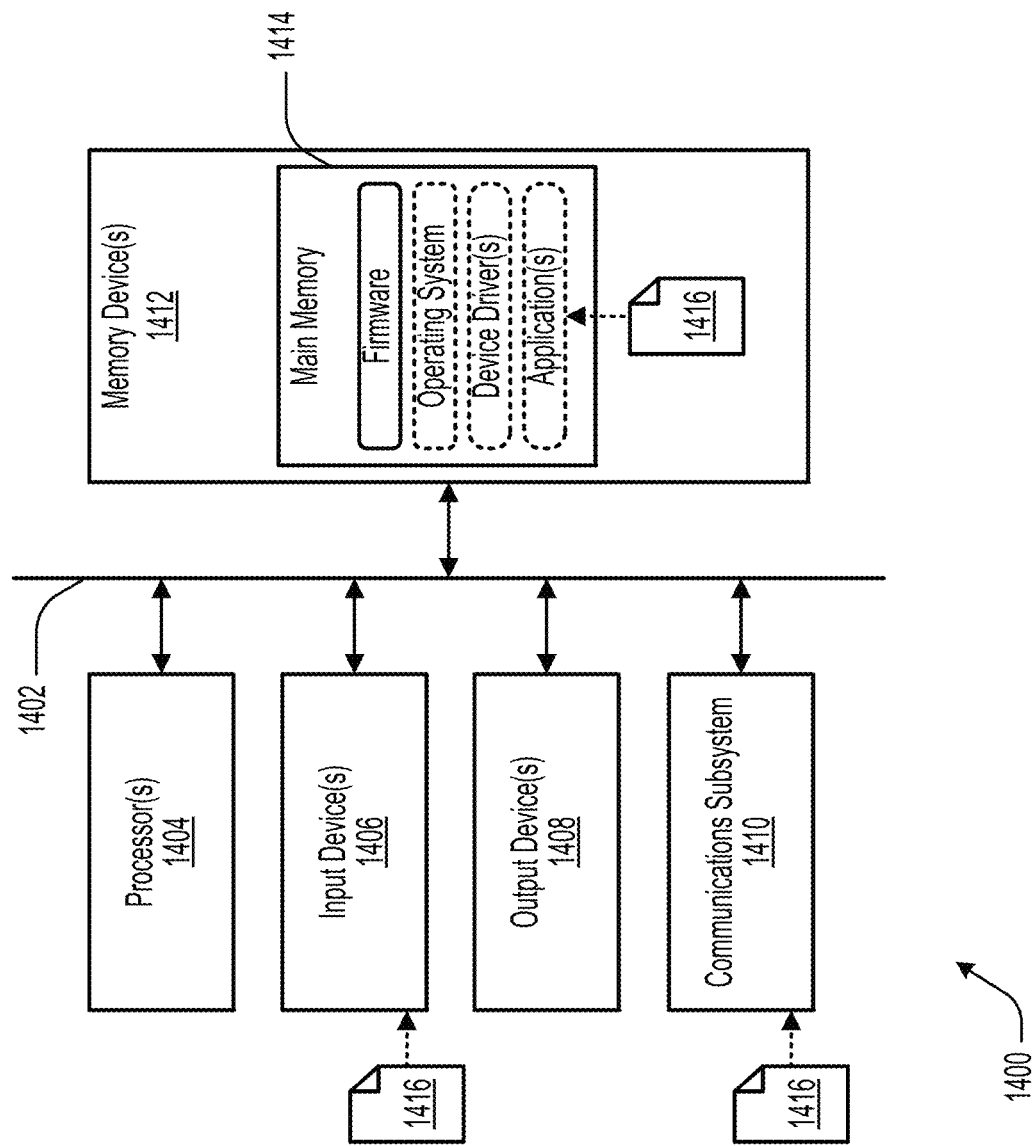
FIG. 14 illustrates an example computer system comprising various hardware elements according to some embodiments of the present invention.

FIG. 14 illustrates an example computer system 1400 comprising various hardware elements, according to some embodiments of the present invention. Computer system 1400 may be incorporated into or integrated with devices described herein and/or may be configured to perform some or all of the steps of the methods provided by various embodiments. For example, in various embodiments, computer system 1400 may be incorporated into or operated in conjunction with IMU 100 and/or gyroscopes 104, 204, 304 and/or may be configured to perform or initiate methods 1200 and/or 1300. It should be noted that FIG. 14 is meant only to provide a generalized illustration of various components, any or all of which may be utilized as appropriate. FIG. 14, therefore, broadly illustrates how individual system elements may be implemented in a relatively separated or relatively more integrated manner.

In the illustrated example, computer system 1400 includes a communication medium 1402, one or more processor(s) 1404, one or more input device(s) 1406, one or more output device(s) 1408, a communications subsystem 1410, and one or more memory device(s) 1412. Computer system 1400 may be implemented using various hardware implementations and embedded system technologies. For example, one or more elements of computer system 1400 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 1400 may be coupled via communication medium 1402. While communication medium 1402 is illustrated as a single connection for purposes of clarity, it should be understood that communication medium 1402 may include various numbers and types of communication media for transferring data between hardware elements. For example, communication medium 1402 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 1402 may include one or more buses connecting pins of the hardware elements of computer system 1400. For example, communication medium 1402 may include a bus connecting processor(s) 1404 with main memory 1414, referred to as a system bus, and a bus connecting main memory 1414 with input device(s) 1406 or output device(s) 1408, referred to as an expansion bus. The system bus may consist of several elements, including an address bus, a data bus, and a control bus. The address bus may carry a memory address from processor(s) 1404 to the address bus circuitry associated with main memory 1414 in order for the data bus to access and carry the data contained at the memory address back to processor(s) 1404. The control bus may carry commands from processor(s) 1404 and return status signals from main memory 1414. Each bus may include multiple wires for carrying multiple bits of information and each bus may support serial or parallel transmission of data.

Processor(s) 1404 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOS- FET) construction. Processor(s) 1404 may include one or more multi-core processors, in which each core may read and execute program instructions simultaneously with the other cores.

Input device(s) 1406 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 1406 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 1408 may include one or more of various devices that convert information into human-readable form, such as without limitation a display device, a speaker, a printer, and/or the like. Output device(s) 1408 may also include devices for writing to removable storage devices or other removable media, such as those described in reference to input device(s) 1406. Output device(s) 1408 may also include various actuators for causing physical movement of one or more components. Such actuators may be hydraulic, pneumatic, and/or electric, and may be provided with control signals by computer system 1400.

Communications subsystem 1410 may include hardware components for connecting computer system 1400 to systems or devices that are located external computer system 1400, such as over a computer network. In various embodiments, communications subsystem 1410 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 1412 may include the various data storage devices of computer system 1400. For example, memory device(s) 1412 may include various types of computer memory with various response times and capacities, from faster response times and lower capacity memory, such as processor registers and caches (e.g., L0 L1, L2), to medium response time and medium capacity memory, such as random access memory, to lower response times and lower capacity memory, such as solid state drives and hard drive disks. While processor(s) 1404 and memory device(s) 1412 are illustrated as being separate elements, it should be understood that processor(s) 1404 may include varying levels of on-processor memory, such as processor registers and caches that may be utilized by a single processor or shared between multiple processors.

Memory device(s) 1412 may include main memory 1414, which may be directly accessible by processor(s) 1404 via the memory bus of communication medium 1402. For example, processor(s) 1404 may continuously read and execute instructions stored in main memory 1414. As such, various software elements may be loaded into main memory 1414 to be read and executed by processor(s) 1404 as illustrated in FIG. 14. Typically, main memory 1414 is volatile memory, which loses all data when power is turned off and accordingly needs power to preserve stored data. Main memory 1414 may further include a small portion of non-volatile memory containing software (e.g., firmware, such as BIOS) that is used for reading other software stored in memory device(s) 1412 into main memory 1414. In some embodiments, the volatile memory of main memory 1414 is implemented as random-access memory (RAM), such as dynamic RAM (DRAM), and the non-volatile memory of main memory 1414 is implemented as read-only memory (ROM), such as flash memory, erasable programmable read-only memory (EPROM), or electrically erasable programmable read-only memory (EEPROM).

Computer system 1400 may include software elements, shown as being currently located within main memory 1414, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 1416, executable by computer system 1400. In one example, such instructions 1416 may be received by computer system 1400 using communications subsystem 1410 (e.g., via a wireless or wired signal carrying instructions 1416), carried by communication medium 1402 to memory device(s) 1412, stored within memory device(s) 1412, read into main memory 1414, and executed by processor(s) 1404 to perform one or more steps of the described methods. In another example, instructions 1416 may be received by computer system 1400 using input device(s) 1406 (e.g., via a reader for removable media), carried by communication medium 1402 to memory device(s) 1412, stored within memory device(s) 1412, read into main memory 1414, and executed by processor(s) 1404 to perform one or more steps of the described methods.

In some embodiments of the present disclosure, instructions 1416 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 1400. For example, the non-transitory computer-readable medium may be one of memory device(s) 1412, as shown in FIG. 14, with instructions 1416 being stored within memory device(s) 1412. In some cases, the non-transitory computer-readable medium may be separate from computer system 1400. In one example, the non-transitory computer-readable medium may a removable media provided to input device(s) 1406, such as those described in reference to input device(s) 1406, as shown in FIG. 14, with instructions 1416 being provided to input device(s) 1406. In another example, the non-transitory computer-readable medium may a component of a remote electronic device, such as a mobile phone, that may wirelessly transmit a data signal carrying instructions 1416 to computer system 1400 using communications subsystem 1410, as shown in FIG. 14, with instructions 1416 being provided to communications subsystem 1410.

Instructions 1416 may take any suitable form to be read and/or executed by computer system 1400. For example, instructions 1416 may be source code (written in a human-readable programming language such as Java, C, C++, C#, Python), object code, assembly language, machine code, microcode, executable code, and/or the like. In one example, instructions 1416 are provided to computer system 1400 in the form of source code, and a compiler is used to translate instructions 1416 from source code to machine code, which may then be read into main memory 1414 for execution by processor(s) 1404. As another example, instructions 1416 are provided to computer system 1400 in the form of an executable file with machine code that may immediately be read into main memory 1414 for execution by processor(s) 1404. In various examples, instructions 1416 may be provided to computer system 1400 in encrypted or unencrypted form, compressed or uncompressed form, as an installation package or an initialization for a broader software deployment, among other possibilities.

In one aspect of the present disclosure, a system (e.g., computer system 1400) is provided to perform methods in accordance with various embodiments of the present disclosure. For example, some embodiments may include a system comprising one or more processors (e.g., processor(s) 1404) that are communicatively coupled to a non-transitory computer-readable medium (e.g., memory device(s) 1412 or main memory 1414). The non-transitory computer-readable medium may have instructions (e.g., instructions 1416) stored therein that, when executed by the one or more processors, cause the one or more processors to perform the methods described in the various embodiments.

In another aspect of the present disclosure, a computer-program product that includes instructions (e.g., instructions 1416) is provided to perform methods in accordance with various embodiments of the present disclosure. The computer-program product may be tangibly embodied in a non-transitory computer-readable medium (e.g., memory device(s) 1412 or main memory 1414). The instructions may be configured to cause one or more processors (e.g., processor(s) 1404) to perform the methods described in the various embodiments.

In another aspect of the present disclosure, a non-transitory computer-readable medium (e.g., memory device(s) 1412 or main memory 1414) is provided. The non-transitory computer-readable medium may have instructions (e.g., instructions 1416) stored therein that, when executed by one or more processors (e.g., processor(s) 1404), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of locking a laser to a ring resonator of a weak value device, the method comprising:
    generating input light at the laser;
    sending the input light to a bright port of the weak value device;
    modifying the input light at the weak value device using the ring resonator and weak value amplification (WVA) techniques to form return light;
    sending the return light from the bright port to a stabilizing structure;
    generating a tuning signal at the stabilizing structure based on the return light; and
    controlling one or both of the laser or the ring resonator using the tuning signal to lock a frequency of the laser to a resonance frequency of the ring resonator.

2. The method of claim 1, wherein modifying the input light at the weak value device using the ring resonator further forms output light.

3. The method of claim 2, wherein the output light is outputted at a dark port of the weak value device, and wherein the dark port is separate from the bright port.

4. The method of claim 3, wherein the output light is detected by a detector coupled to the dark port.

5. The method of claim 4, wherein the output light as detected by the detector is used to determine a rotation of a photonic device that includes the laser, the stabilizing structure, the weak value device, and the detector.

6. The method of claim 1, further comprising adding sidebands to the input light at the stabilizing structure.

7. The method of claim 6, wherein the tuning signal is generated based on the sidebands of the return light.

8. The method of claim 1, wherein the tuning signal causes the frequency of the laser to increase or decrease towards the resonance frequency of the ring resonator.

9. The method of claim 1, wherein the tuning signal causes the resonance frequency of the ring resonator to increase or decrease towards the frequency of the laser.

10. A photonic device comprising:
- a laser configured to generate input light;
- a weak value device having a ring resonator and a bright port, the weak value device configured to:
  - receive the input light at the bright port from the laser;
  - modify the input light using the ring resonator and weak value amplification (WVA) techniques to form return light; and
  - send the return light from the bright port to a stabilizing structure; and
- the stabilizing structure configured to:
  - generate a tuning signal based on the return light; and
  - control one or both of the laser or the ring resonator using the tuning signal to lock a frequency of the laser to a resonance frequency of the ring resonator.

11. The photonic device of claim 10, wherein the photonic device is a gyroscope.

12. The photonic device of claim 10, wherein modifying the input light at the weak value device using the ring resonator further forms output light.

13. The photonic device of claim 12, wherein the weak value device is further configured to output the output light at a dark port of the weak value device, and wherein the dark port is separate from the bright port.

14. The photonic device of claim 13, further comprising a detector coupled to the dark port and configured to detect the output light.

15. The photonic device of claim 14, wherein the output light as detected by the detector is used to determine a rotation of the photonic device.

16. The photonic device of claim 10, wherein the stabilizing structure is further configured to add sidebands to the input light.

17. The photonic device of claim 16, wherein the tuning signal is generated based on the sidebands of the return light.

18. The photonic device of claim 10, wherein:
- the tuning signal causes the frequency of the laser to increase or decrease towards the resonance frequency of the ring resonator, or
- the tuning signal causes the resonance frequency of the ring resonator to increase or decrease towards the frequency of the laser.

\* \* \* \* \*